US012305784B2

(12) United States Patent
Usevitch et al.

(10) Patent No.: US 12,305,784 B2
(45) Date of Patent: May 20, 2025

(54) SYSTEMS AND METHODS FOR PROVIDING A TUBE AND CORD ORGANIZATION SYSTEM

(71) Applicant: NURSETECH MEDICAL CORP, Dover, DE (US)

(72) Inventors: David Edward Usevitch, Baltimore, MD (US); Alexandra Lorraine Smith, Hillsboro, OR (US)

(73) Assignee: Nursetech Medical Corp., Dover, DE (US)

( * ) Notice: Subject to any disclaimer, the term of this patent is extended or adjusted under 35 U.S.C. 154(b) by 0 days.

(21) Appl. No.: 18/143,753

(22) Filed: May 5, 2023

(65) Prior Publication Data
US 2023/0358342 A1 Nov. 9, 2023

Related U.S. Application Data

(60) Provisional application No. 63/338,597, filed on May 5, 2022.

(51) Int. Cl.
*F16L 11/00* (2006.01)
*F16L 3/06* (2006.01)
(Continued)

(52) U.S. Cl.
CPC .................. *F16L 3/221* (2013.01); *F16L 3/06* (2013.01); *F16L 3/23* (2013.01); *F16M 13/02* (2013.01); *H02G 3/0437* (2013.01)

(58) Field of Classification Search
CPC ...... F16L 3/221; F16L 3/06; F16L 3/23; F16L 3/13; F16M 13/02; H02G 3/0437; H02G 3/32
See application file for complete search history.

(56) References Cited

U.S. PATENT DOCUMENTS 2,179,406 A * 11/1939 Fitzpatrick .............. F16L 3/221
174/149 R
2,322,753 A * 6/1943 Thomas ................. A61M 5/204
248/229.11
(Continued)

FOREIGN PATENT DOCUMENTS

CN 201712385 1/2011
CN 209984766 1/2020
(Continued)

*Primary Examiner* — Amy J. Sterling
(74) *Attorney, Agent, or Firm* — David B. Tingey; K. Russell Griggs; Kirton McConkie

(57) ABSTRACT

A tube and cord organization system includes a clamp that is configured to clamp onto a support structure. In some cases, the clamp defines a receiving hole. In some cases, the system further includes an adapter bracket. In some such cases, the adapter bracket is configured to attach to the clamp via a protrusion of the adapter bracket and the receiving hole. In some cases, a face of the adapter bracket forms a hole. In some cases, the adapter bracket is configured to be rotatable relative to the clamp about a first axis. In some cases, the system further includes a clip that is configured to secure one or more tubes or cords. In some such cases, the clip is configured to be rotatable relative to the adapter bracket about a second axis. Other implementations are described.

20 Claims, 22 Drawing Sheets

(51) Int. Cl.
*F16L 3/22* (2006.01)
*F16L 3/23* (2006.01)
*F16M 13/02* (2006.01)
*H02G 3/04* (2006.01)

(56) References Cited

U.S. PATENT DOCUMENTS

| | | | | | |
|---|---|---|---|---|---|
| 3,385,545 | A | * | 5/1968 | Patton | F16L 3/222 |
| | | | | | 248/316.1 |
| 3,747,166 | A | * | 7/1973 | Eross | F16L 3/24 |
| | | | | | 403/188 |
| 4,515,278 | A | * | 5/1985 | DeVroom | A61B 5/0215 |
| | | | | | 248/231.71 |
| 4,632,221 | A | * | 12/1986 | Stanford | E04G 7/14 |
| | | | | | 403/49 |
| 5,320,312 | A | * | 6/1994 | Hoenninger | F16L 3/227 |
| | | | | | 248/68.1 |
| 5,443,232 | A | * | 8/1995 | Kesinger | H02G 3/263 |
| | | | | | 248/62 |
| 5,601,197 | A | * | 2/1997 | Baxter | A47F 5/0892 |
| | | | | | 211/115 |
| 5,697,129 | A | * | 12/1997 | Newville | B25F 1/02 |
| | | | | | 24/339 |
| 7,241,071 | B2 | * | 7/2007 | Carraher | E04C 5/163 |
| | | | | | 52/719 |
| 7,533,854 | B2 | * | 5/2009 | Aube | A61M 5/1417 |
| | | | | | 248/95 |
| 7,959,122 | B1 | * | 6/2011 | Clack-Hopkins | A61M 5/1417 |
| | | | | | 248/315 |
| 8,162,557 | B2 | * | 4/2012 | Van Zile, III | B25J 15/0061 |
| | | | | | 403/396 |
| 8,245,733 | B2 | * | 8/2012 | Renaud | F02M 35/10137 |
| | | | | | 248/62 |
| 9,033,298 | B2 | * | 5/2015 | Philipp | F16L 3/227 |
| | | | | | 248/316.1 |
| 9,599,132 | B2 | * | 3/2017 | Wyndon | F16L 59/12 |
| 10,548,685 | B2 | * | 2/2020 | Gibbs | A61B 90/50 |
| 2021/0324972 | A1 | * | 10/2021 | Arnold | F16L 3/243 |
| 2024/0117897 | A1 | * | 4/2024 | Minder | A61G 7/0503 |

FOREIGN PATENT DOCUMENTS

| | | |
|---|---|---|
| CN | 211245111 | 8/2020 |
| CN | 214911243 | 11/2021 |
| JP | 2011098067 | 5/2011 |

* cited by examiner

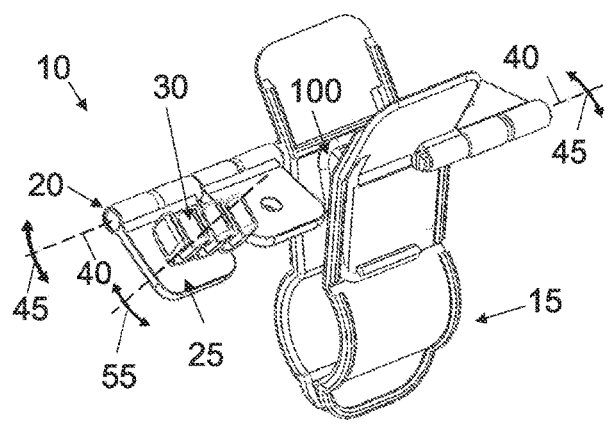
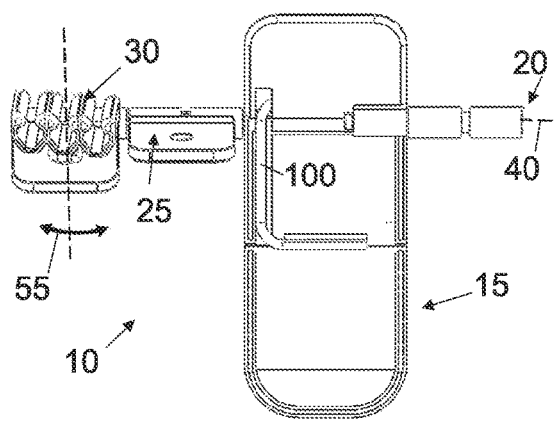
FIG. 6A
FIG. 6B
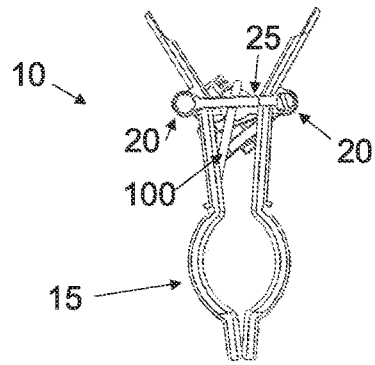
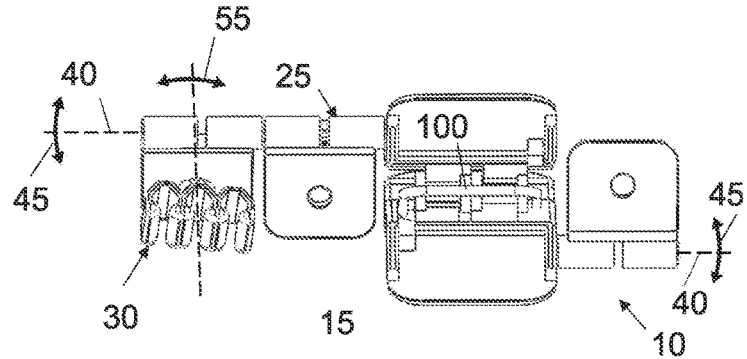
FIG. 6C
FIG. 6D

SYSTEMS AND METHODS FOR PROVIDING A TUBE AND CORD ORGANIZATION SYSTEM

RELATED APPLICATION

This non-provisional, utility patent application claims priority to U.S. Provisional Patent Application Ser. No. 63/338,597, filed May 5, 2022, and entitled "TUBE AND CORD ORGANIZATION SYSTEM"; the entire disclosure of which is incorporated herein by reference.

TECHNICAL FIELD

The described systems and methods relate to a tube and cord organization system, particularly to a tube and cord organization system that can be used in the medical field.

BACKGROUND

Tubes and cords are commonly used in the medical field. Tubes and cords can be coupled between a patient and a medical machine and/or a medicine dispenser.

SUMMARY

The described systems and methods relate to a tube and cord organization system, specifically to a tube and cord organization system that can be used in the medical field.

Tubes are commonly used in the medical field to administer medicine (e.g., drugs, fluids, etc.) to patients. Tubes may be coupled between a medicine dispenser and a port connected to the patient. For example, a tube may direct an intravenous (IV) solution from an IV bag suspended from an IV pole to a catheter attached to and/or inserted into a patient. In another example, one or more tubes may couple a patient to a dialysis machine. The tubes may be coupled to the patient each by a catheter inserted into a vein (e.g., a blood passageway) of the patient. The tubes may not be easily replaceable should they be inadvertently pulled from the patient. Additionally, the tubes may be susceptible to tangling. A nurse or medical assistant may be required to spend valuable time untangling the tubes to prevent patient discomfort and/or prevent an unsafe condition. Additionally, tangled tubes may lead to confusion by medical personnel and incorrect medicine may be administered to the patient which may cause patient injury or harm. Tangling medical tubes can be much more problematic when a large number of tubes are present. For example, in many intensive care units (ICUs), many IV tubes may be coupled to the patient from a corresponding number of IV pump machines to deliver a variety of medications. Thus, it is important for tubes to be well-organized.

Cords (e.g., electrical cords, etc.) are also commonly used in the medical field to monitor one or more conditions of a patient (e.g., heart rate, blood pressure, etc.). A cord may couple a sensor on a patient to a monitoring machine. For example, one or more cords may couple one or more sensors on a patient to an electrocardiogram (EKG) machine. These cords may be vital to monitoring a condition of the patient. Like the tubes described above, cords may also be susceptible to tangling. A nurse or medical assistant may be required to spend valuable time untangling the cords, again to prevent patient discomfort and/or to prevent an unsafe condition.

Often, patients coupled to tubes and/or cords must be moved. Moving a patient may be for reasons of transporting the patient to or from an exam room, transporting the patient to or from an operating room for a procedure, transporting the patient to or from a restroom, transporting the patient to or from an imaging room for an imaging procedure (e.g., computerized tomography scan, magnetic resonance imaging scan, etc.) transporting the patient to or from an ambulance, or simply rolling the patient over in a bed. During a transport procedure (e.g., as described previously), the tubes and/or cords coupled to the patient must additionally be moved with the patient. In many instances, the tubes and/or cords must remain coupled to the patient during transport of the patient. Often, during a transition to or from a transporting state (e.g., getting the patient out of bed, rolling the patient over in bed, laying the patient down in a bed, sitting the patient down, etc.) the tubes and/or cords may become tangled. In some instances, tangling of tubes and/or cords may cause the tubes and/or cords to become dislodged from the patient. At a minimum, this can cause patient discomfort. However, this could cause severe injury to the patient in many instances. Additionally, a nurse, a doctor, or another medical assistant may use valuable time to reattach the tubes and/or cords to the patient.

Some techniques are conventionally used to organize medical tubes and cords coupled to a patient. Many of these techniques are "hacks" developed by nurses or other medical assistants as necessary. For example, nurses commonly use self-built systems of tape and/or tongue depressors to organize tubes or cords. Nurses may often tape the tubes or cords to a bed rail (e.g., a hospital bed rail) where the tubes or cords cross the bed rail. Nurses may use tongue depressors to fasten multiple tubes or cords to the bed rail. These conventional "hacks" may not securely fasten the tubes and/or cords to the bed. The tape used may be prone to losing adhesion to a surface, allowing the tubes or cords to move and become tangled.

Other conventional devices, techniques, or methods exist to organize medical tubes or cords coupled to a patient. However, these conventional systems may lack the necessary mobility requirements demanded by nurses or other medical staff. For example, a system for organizing tubes and cords that is permanently mounted or semi-permanently mounted to a bed rail suffers from a lack of mobility. A nurse or assistant may be required to remove all tubes and cords from the conventional system so that the patient can be transported. Some conventional systems utilize a strap which can secure a 'bundle' of tubes and/or cords (e.g., multiple tubes and/or cords). However, these bundling systems may not adequately prevent tangling of the tubes or cords and do not provide adequate organization.

The devices, systems, and methods disclosed herein provide a tube and cord organization system. The tube and cord organization system may manage organization of one or more medical tubes and/or cords. In some implementations, the tube and cord organization system may include a clamp for attaching the system to differing structures. The system may further include one or more adapter brackets coupled to the clamp. In some implementations, the one or more adapter brackets each may be configured to receive an additional adapter bracket. Thus, the system may be modular (e.g., substantially modular). Each of the adapter brackets may be configured to receive a clip for securing and/or organizing a tube or cord. The clip may have one of multiple differing structures, some of which are described below. The tube and cord organization system may provide for multiple degrees of freedom (e.g., two or more degrees of movement of a secured tube or cord) while securely fastening one or more tubes and/or cords. In some implementations, the system may include one or more degrees of freedom. For example, the system may allow tubes or cords secured by the system to freely rotate about a first axis and/or a second axis as needed to avoid crimping or unnecessary pulling on the tubes or cords. The one or more degrees of freedom may allow the tubes or cords secured by the system to be oriented at various angles to effectively secure the tubes and/or cords.

In some implementations, the clamp included in the system described herein may be a spring-loaded clamp configured to attach to one or more structures. The clamp may be configured to clamp to a support structure (e.g., a common hospital structure). For example, the clamp may be configured to attach to a bed rail (e.g., of a hospital bed), to an IV pole, to a wheelchair, to a bedside and/or a side table, or to any variety of other medical structures and/or non-medical structures. The clamp may be spring-loaded to securely couple the system to a structure described above. A user (e.g., a nurse, a doctor, a medical assistant, etc.) may be able to manually open the clamp by squeezing one or more features of the clamp (e.g., one or more handle portions of the clamp) and attach or remove the clamp to a structure such as a hospital bed. The clamp may be easily transferred from one structure (e.g., a bed rail) to another structure (e.g., an IV pole) quickly and easily. In some implementations, the clamp may include a screw attachment, a compliant groove that can attach to a structure via frictional grasping, adjustable and/or compliant ends that can be deformed to wrap around a structure. In some implementations, the clamp is configured to wrap around a support structure. For instance, some embodiments comprise superelastic nitinol and/or any other suitable material that allows the clamp to function like a snapping wristband to wrap around a support structure.

In some Implementations, the clamp may be a plastic clamp. The clamp may be formed from two pieces and/or a spring. The two plastic pieces may be identical and/or symmetrical to aid in manufacturing. In some implementations, at least the two plastic pieces of the clamp may be injection-molded plastic. The two pieces of the clamp may be interfaced together by a hollow or non-hollow cylinder formed by one piece of the clamp and an interfacing arc formed by another piece of the clamp to interface with the cylinder. The cylinder and interfacing arc may form a hinge of the clamp. The cylinder may additionally provide one or more points of attachment for one or more adapter brackets. In some implementations, an adapter bracket may be coupled to the clamp on a first side of the clamp and/or on a second side of the clamp. The clamp may include a groove between the cylinder and the interfacing arc to allow ends of the one or more adapter brackets to lock (or secure) into place. In some implementations, the clamp includes a spring (e.g., a coil spring, a flat spring, etc.) to provide clamping force. In some implementations, the clamp can be quickly removed from a structure (e.g., an IV pole, a bed rail, etc.) by a user by gripping and/or squeezing a handle portion of the clamp. For example, an emergency situation (e.g., an emergency transport, etc.) may necessitate quick removal of the clamp (and thus the system) from a bed. In some implementations, a body of the clamp may include a hook and/or form a hole. The hook and/or hole may allow the clamp to be hung (e.g., from an IV pole, from another hook, etc.) to quickly transfer the tube and cord organization system.

In some implementations, the clamp includes a circular groove in addition to grasping tips opposite handles of the clamp. Pressure exerted on the handles (e.g., by a user) may open the tips. In some implementations, the circular groove is designed to grasp common hospital structures (e.g., IV poles, hospital beds, etc.) or other substantially cylindrically shaped structures. In some implementations, the grasping tips include teeth (e.g., teeth structures), coated ends (e.g., plastic- or rubber-dipped coated ends for increased grip), magnets, or other gripping enhancers adhered to and/or coupled to an inner surface of the grasping tips.

In some implementations, the one or more adapter brackets may be configured to attach to the clamp. The adapter brackets may additionally be configured to attach to another adapter bracket, in some implementations. Thus, in such implementations, the adapter brackets may be configured each to receive another adapter bracket. In some implementations, the one or more adapter brackets may be made of plastic, another polymer, and/or any other suitable material or materials. In some implementations, the one or more adapter brackets may be made of injection-molded plastic.

In some implementations, each of the one or more adapter brackets may include a protrusion to attach the adapter bracket either to the clamp or to another adapter bracket. In some implementations, each adapter bracket forms an opening (e.g., a hole, a receptacle, etc.) to receive a protrusion of another adapter bracket. Multiple adapter brackets may be coupled to form a chain of adapter brackets extending from the clamp. The protrusion may include a ring and/or modified ring geometry (e.g., a ring-like locking extension on the end of the protrusion) and may form a slot to allow a tip of the protrusion to comply (e.g., bend, deform, etc.) as the protrusion is inserted into a receiving hole (e.g., a receptacle to receive a protrusion of an adapter bracket) of the clamp or another adapter bracket. In some implementations, the tip may lock (or engage) in the receiving hole (e.g., via the ring) when the protrusion is fully inserted. Additionally, in some implementations, the adapter bracket can be quickly released from the receiving hole when sufficient force is applied to pull the protrusion from the receiving hole. In some implementations, each of the adapter brackets can be rotated about an axis of the protrusion and/or an axis of the receiving hole (e.g., of another adapter bracket or of the clamp). This rotation about an axis of the protrusion and/or an axis of the receiving hole may be a first degree of freedom of the system.

In some implementations, an adapter bracket defines one or more holes in a face of the adapter bracket. The holes in the face of the adapter bracket may be a receptacle to receive a clip configured to secure a tube or a cord, as described below. A feature of a tube and/or cord clip (e.g., a tube and/or cord holder) as described in more detail below may be inserted into the hole. For example, a protruding ring on a substantially cylindrical end of a clip (e.g., a tube and/or cord clip) may secure the clip to the bracket. The clip may form a receptacle to receive a tube and/or a cord. In some implementations, the clip may be attached to the adapter bracket by inserting the end of the clip through the hole formed in the face of the adapter bracket. The ring may be forced through the hole and may secure the clip to the bracket. The clip may be pulled from the bracket with sufficient force. In some implementations, the clip is configured to be rotatable about an axis of the clip end relative to the adapter bracket when attached to the adapter bracket. This rotation may be a second degree of freedom of the system. The clip being rotatable about the axis of the clip end may allow for rotation of the clip responsive to a pulling force of a tube or cord secured by the clip. Allowing the clip to rotate relative to the adapter bracket may allow the tube or clip to be pulled slightly without the cord being pulled from the patient.

In some implementations, a clip may attach to the adapter bracket via a quick attach/detach mechanism. The cylindrical end of the clip, together with the ring formed on the clip end and/or the hole formed in the face of the adapter bracket may form a quick attach/detach mechanism. Providing a quick attach/detach mechanism may provide ease of use and/or patient safety. For example, the clip may be quickly removed from the adapter bracket by a nurse in an emergency situation to avoid patient harm (e.g., pulling a tube from a patient, etc.). The clip may be pulled from the adapter bracket by a force similar in magnitude to a force used to insert an end of the clip into the hole formed in the adapter bracket. The clip may be pulled from the adapter bracket should a tube or cord retained by the clip be caught (and/or tangled) so that the tube or cord is not pulled from the patient. Additionally, in some implementations, the tube or cord may be quickly pulled from the clip. The clip may provide a quick release of the tube or cord.

In some implementations, a clip of the tube and cord organization system may have one of many differing shapes. A clip may have a shape to accommodate a specific type of tube or cord. For example, a clip may form a receptacle shape to secure a large-diameter tube. In another example, a clip may form a receptacle shape to secure a small-diameter cord. In a further example, a clip may form a receptacle shape to secure a bundle of tubes or cords (e.g., multiple tubes and/or cords). In some implementations, the medical tube and cord organization described herein may include multiple clips having multiple differing shapes. In some implementations, a clip of the system described herein is made of plastic or another polymer. In some implementations, the clip may be made of injection-molded plastic.

In some implementations, a clip may have a U-shape. A U-shaped clip may be configured to receive a tube or cord in the 'U.' In some implementations, a U-shaped clip includes one or more protrusions proximate to a mouth (or opening) of the TT' configured to retain a tube or cord. The U-shaped clip may be compliant (e.g., may elastically deform). For example, the sides of the U-shaped clip may bend as a tube or cord is pressed into the TT' past the one or more protrusions. A U-shaped clip may be larger (e.g., have a larger U-shape) to accommodate a larger-diameter tube or cord. In some implementations, the U-shaped clip may have a size commensurate with the size of a tube or cord that the U-shaped clip is configured to secure. In some implementations, a clip may include multiple adjacent U-shapes. The multiple adjacent U-shapes may each be configured to secure a tube or a cord.

In some implementations, the clip forms a U-trap. At least a portion of the U-trap may be compliant (e.g., may elastically deform) responsive to one or more tubes or cords being inserted into the U-trap. For example, one or more compliant flaps at an open end of the U-trap may bend to accept a tube or cord and may subsequently bend back to an original position to retain the tube or cord. In some implementations, a U-trap clip may be configured to secure multiple tubes and/or cords. A U-trap clip may allow for multiple tubes and/or cords to be quickly and easily retained by the tube and cord organization system. In some implementations, a U-trap clip may be configured to secure a single tube or cord.

In some implementations, a clip may include a latching clip. A latching clip may include a hinge portion and a latch portion. In some implementations, the hinge portion is a compliant hinge (e.g., a compliant hinge portion). For example, a portion of a latching clip may elastically deform to allow for the latching of the latch portion. A tongue of the latch portion may be received by an opening to securely latch the latching clip and secure a tube or cord. The latching clip may be configured to secure multiple tubes and/or cords in some implementations. In some implementations, the latching clip may be configured to secure a single tube or cord. The latch portion may be configured to quickly release when pulled by a user. The latch portion may release responsive to pulling on the clip itself or may release responsive to a tube or cord pulling against the clip.

In some implementations, a clip may include teeth to separate one or more tubes or cords. For example, a clip may include soft teeth, and/or rigid teeth to secure and/or separate tubes or cords. The teeth may be rubber in some implementations or may be plastic in other implementations. In some implementations, at least a portion of the clip may be coated with a coating material (e.g., a rubber coating material). In some implementations, a clip may include wire ends configured to be bent (e.g., by a user) to form a shape to secure a tube and/or a cord. In some implementations, a clip includes one or more spiral fingers. In some implementations, a clip may include one or more hooks configured to secure a tube or cord. In some implementations, a clip may include one or more ribbons having magnetic end attachments that can secure a tube or a clip. In some implementations, a clip may include sticky tape or plastic to secure a tube or a cord. In some implementations, a clip may include a strap to secure a tube or cord. Multiple tubes and/or cords may be secured by a clip including a strap.

Although the tube and cord organization system is described herein with reference to applications in the medical field, the system may be used in multiple other fields. For example, the system may be used to organize, secure, and/or manage electrical cords in a workshop (e.g., a wood shop, a metal shop, a mechanic shop, etc.). In another example, the system may be used at venues such as music, concert, or recording venues to secure electrical cords for music and/or sound devices (e.g., electric instruments, amplifiers, microphones, sound equipment, etc.). In another example, the system may be useful in places where electrical cords (e.g., extension cords) may pose a trip hazard, such as households, office spaces, restaurants, cafeterias, schools, universities, outdoor carnivals or events, movie sets, scientific labs, etc.

These and other features and advantages of the described systems and methods will be set forth or will become more fully apparent in the description that follows and in the appended claims. The features and advantages may be realized and obtained by means of the instruments and combinations particularly pointed out in the appended claims. Furthermore, the features and advantages of the described systems and methods may be learned by the practice thereof or will be obvious from the description, as set forth hereinafter.

BRIEF DESCRIPTION OF THE DRAWINGS

In order that the manner in which the above recited and other features and advantages of the described systems and methods are obtained, a more particular description of the described systems and methods will be rendered by reference to specific embodiments thereof, which are illustrated in the appended drawings. Understanding that the drawings depict only representative embodiments of the described systems and methods and are not, therefore, to be considered as being limiting in scope, the described systems and methods will be set forth and explained with additional specificity and detail through the use of the accompanying drawings in which:

FIGS. 6A-6D illustrate some additional views of the tube and cord organization system;

DETAILED DESCRIPTION

Figures 1A, 1B:
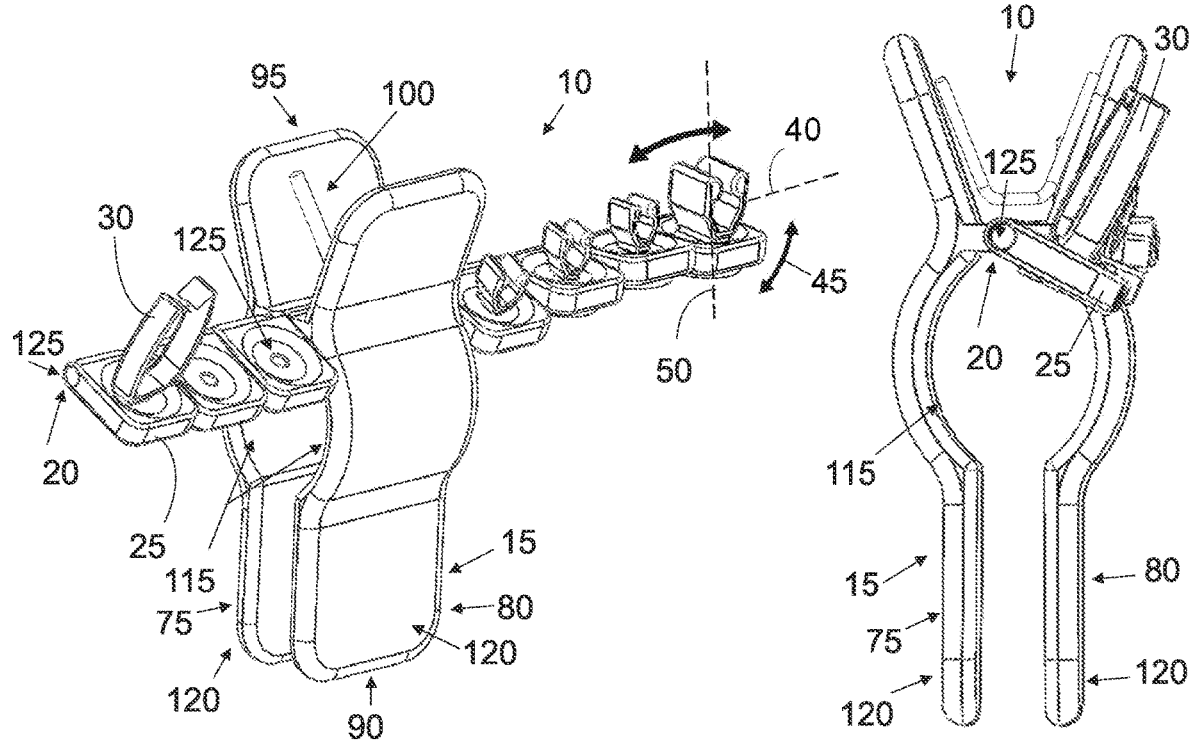
FIGS. 1A-1K illustrate various views of a tube and cord organization system, according to some embodiments.

The devices, systems, and methods disclosed herein provide a system that is configured to hold and/or organize one or more tubes (e.g., feeding tubes, suction tubes, mechanical ventilation tubes, oxygen tubes, and/or any other suitable tubes), cords, fluid bags, disinfecting cap strips, fluid containers, machines, stethoscopes, blood pressure hoses, and or any other suitable object. For simplicity, however, this disclosure discusses using the described organization system to organize and/or hold one or more tubes and/or cords (or tubes/cords). While the described organization system can comprise any suitable component, FIGS. 1A-1K show that, in some embodiments, the organization system 10 comprises one or more clamps 15; coupling system components 20; adapter brackets 25; and/or clips 30 that are configured to secure one or more tubes/cords 35.

While the organization system 10 can function in any suitable manner and perform any suitable purpose, FIGS. 1A-1K show some embodiments in which the organization system 10 is configured to hold and/or otherwise organize one or more tubes/cords 35. Although in some embodiments, the organization system is configured to hold one or more tubes/cords in a one or more fixed orientations with respect to the clamp 15, in some embodiments, the organization system is configured to allow for one or more degrees of freedom (e.g., one, two, three, or more) of secured tubes/cords). In this regard, by allowing for one or more degrees of freedom, some embodiments of the system allow the tubes/cords secured by the system to be selectively and/or freely oriented at various angles to effectively secure the tubes/cords. For example, some embodiments of the system are configured to (a) allow one or more tubes/cords that are secured by the system to freely rotate about a first axis and/or a second axis as needed to (e.g., to allow for the clip 30 to rotate relative to the adapter bracket 25 and/or to allow the tubes/cords and/or the clip to be pulled slightly without the tubes/cords being pulled from the patient and/or (b) avoid: crimping, unnecessary pulling on the tubes/cords, uncomfortable movement of a patient connected to the tubes/cords, etc.).

Figure 1C:
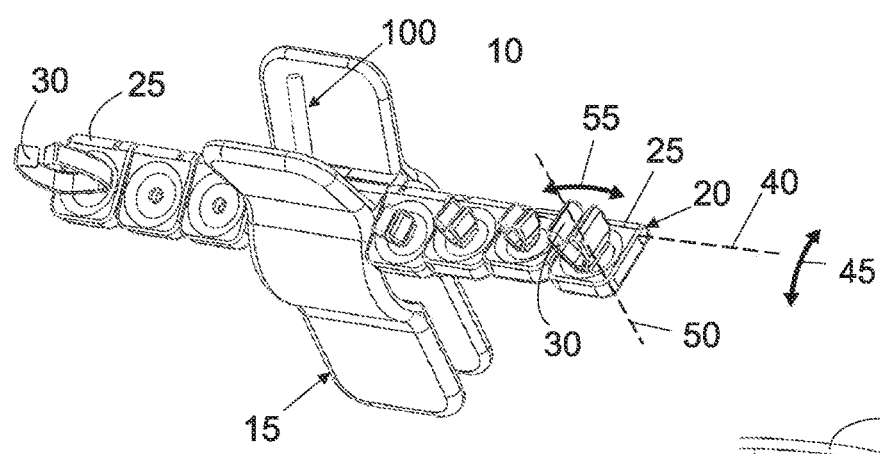
Figure 1D:
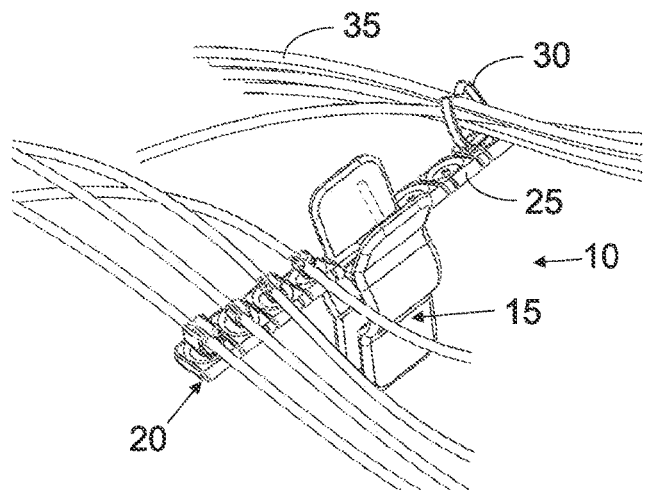
Figure 1E:
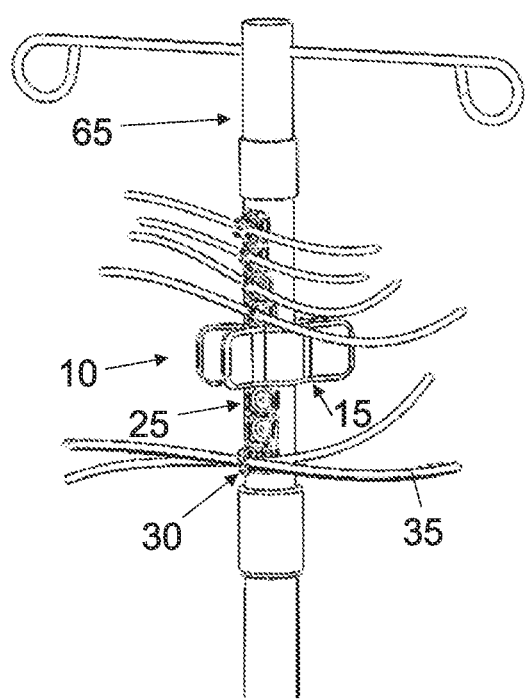
Figure 1F:
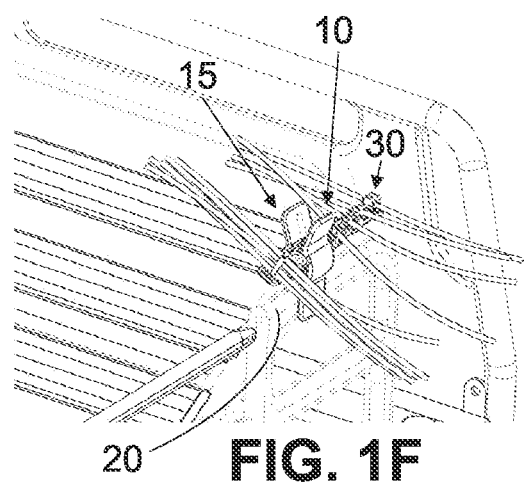
Figure 1G:
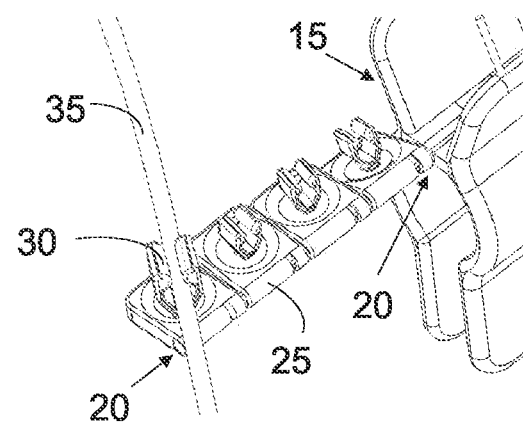
Figure 1H:
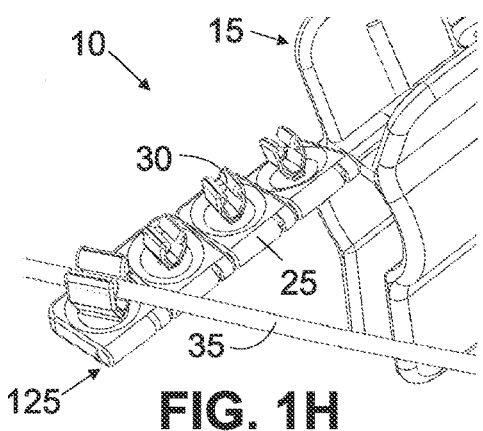
Figure 1I:
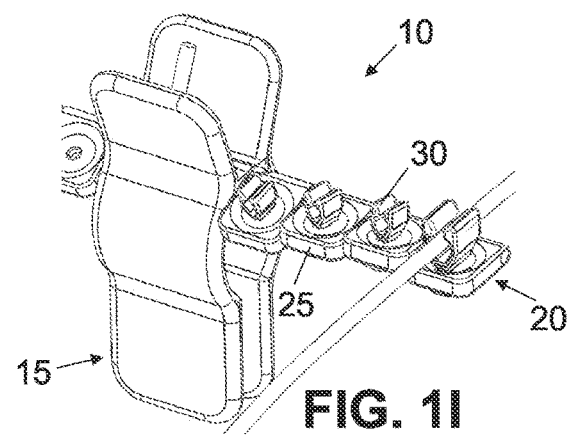
Figure 1J:
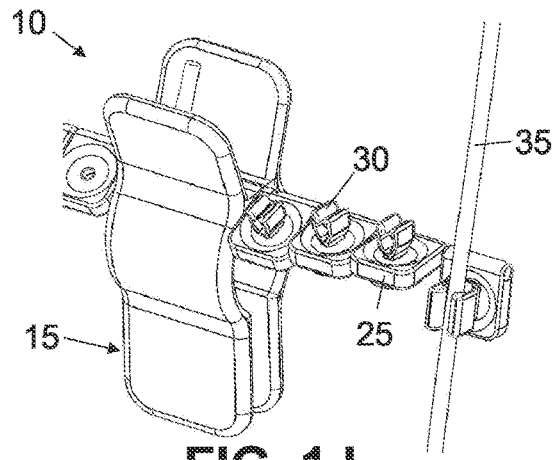
Figure 1K:
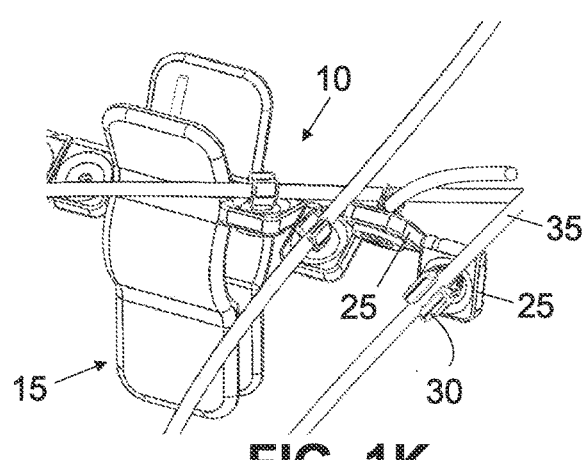
Figure 1L:
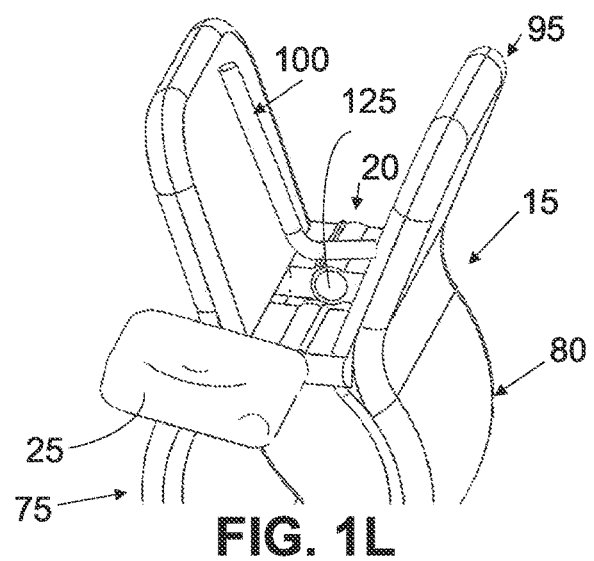
FIGS. 1L-1N illustrate various views of a clamp of the tube and cord organization system, according to some embodiments.
Figure 1M:
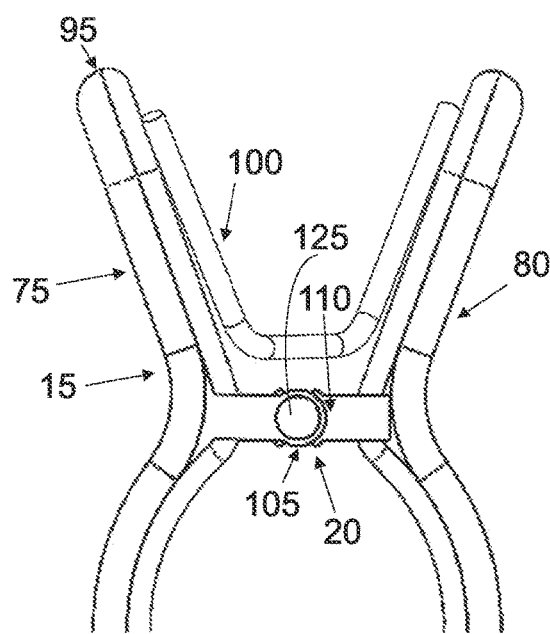
Figure 1N:
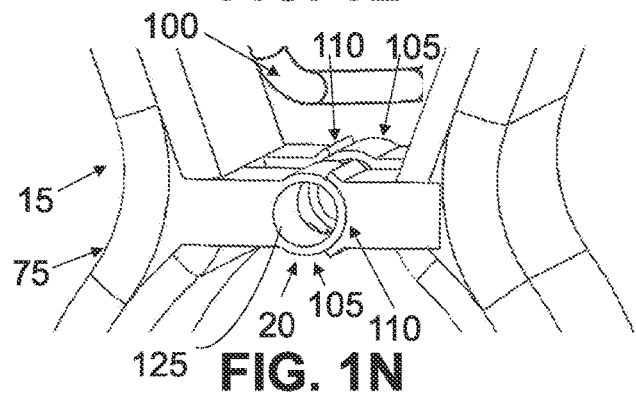
Figure 1O:
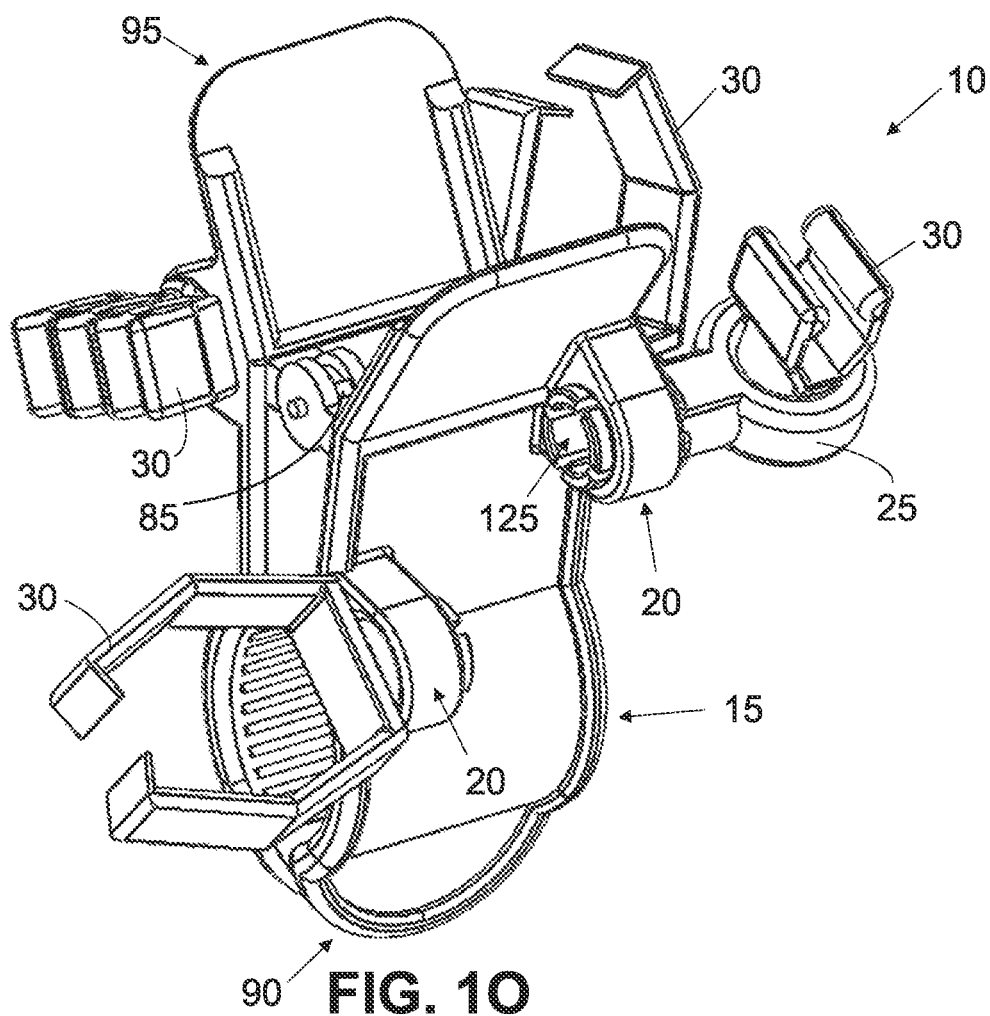
FIGS. 1O-1T illustrate various views in which the tube and cord organization system comprises a spring clamp, according to some embodiments.
Figure 1P:
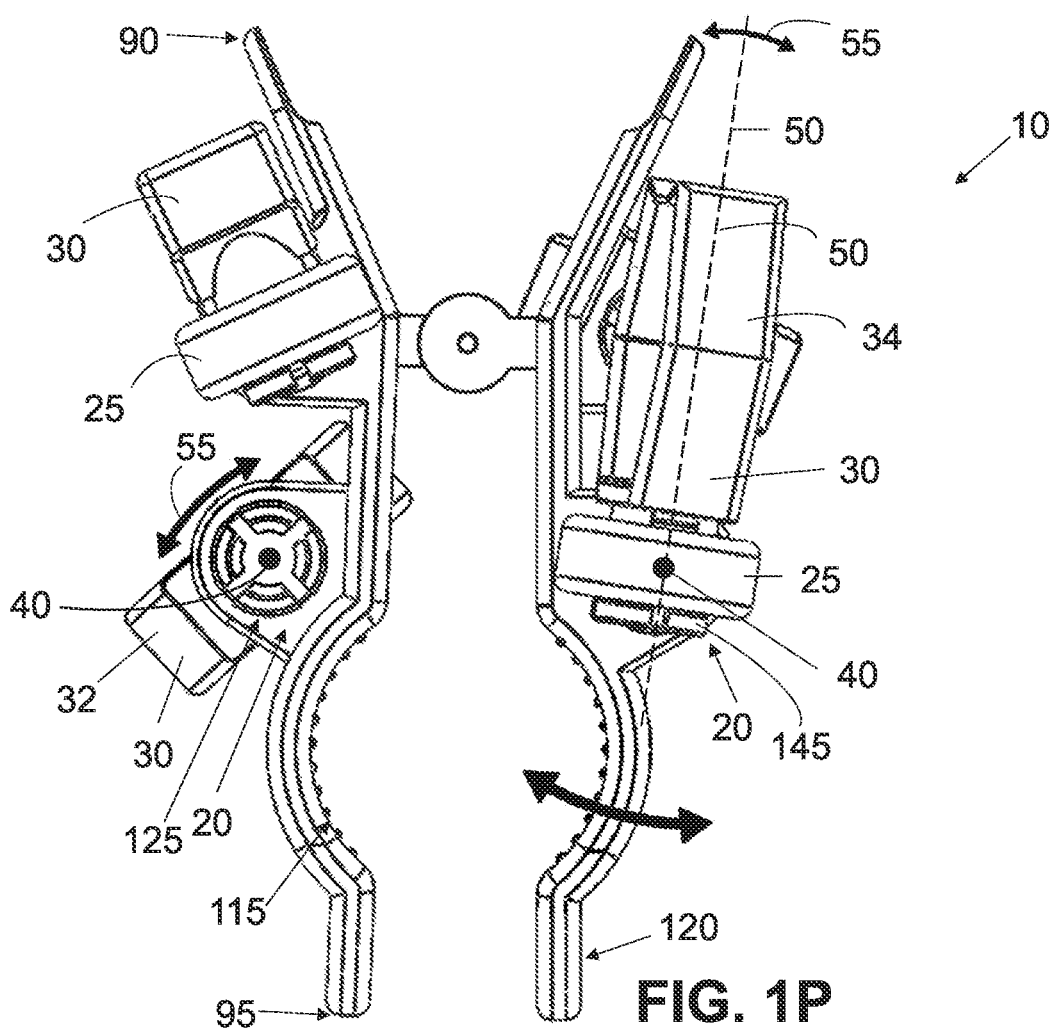
Figure 1Q:
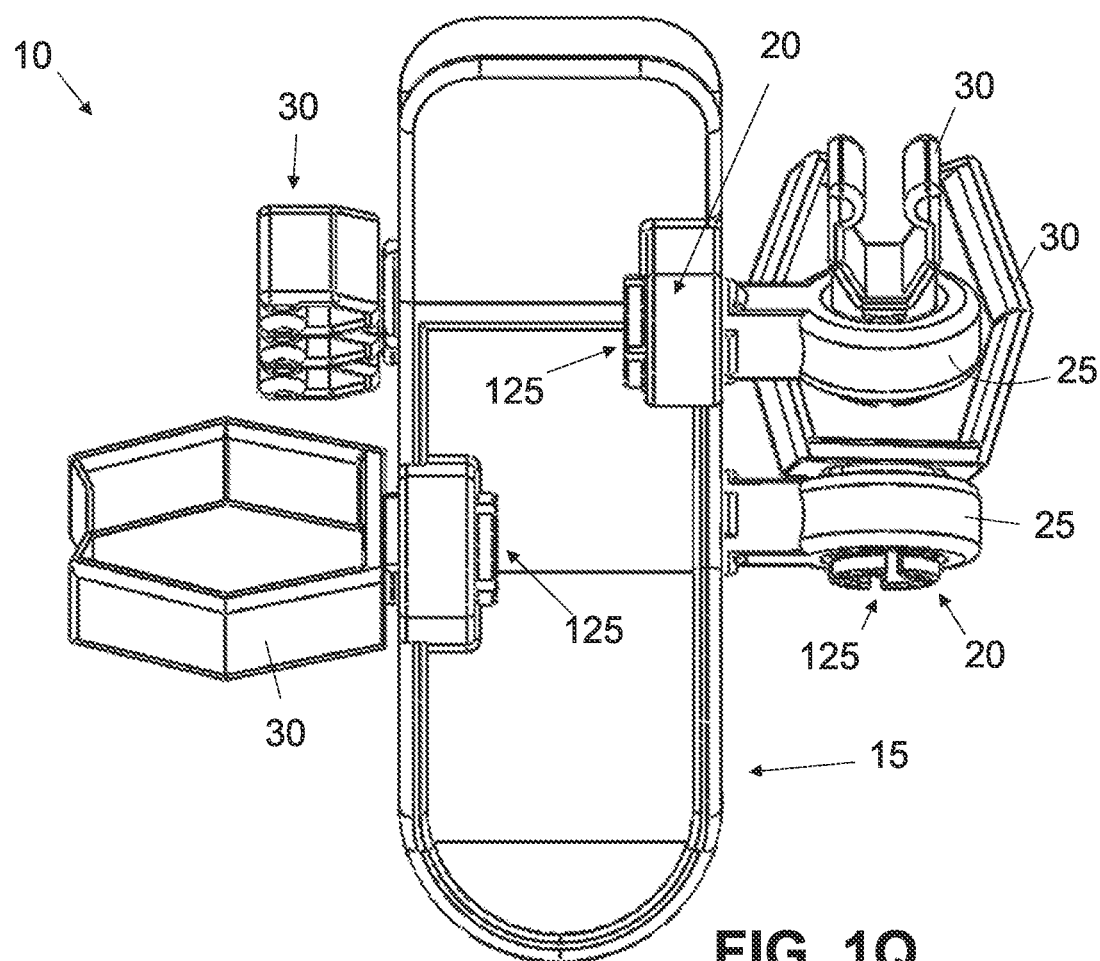
Figure 1R:
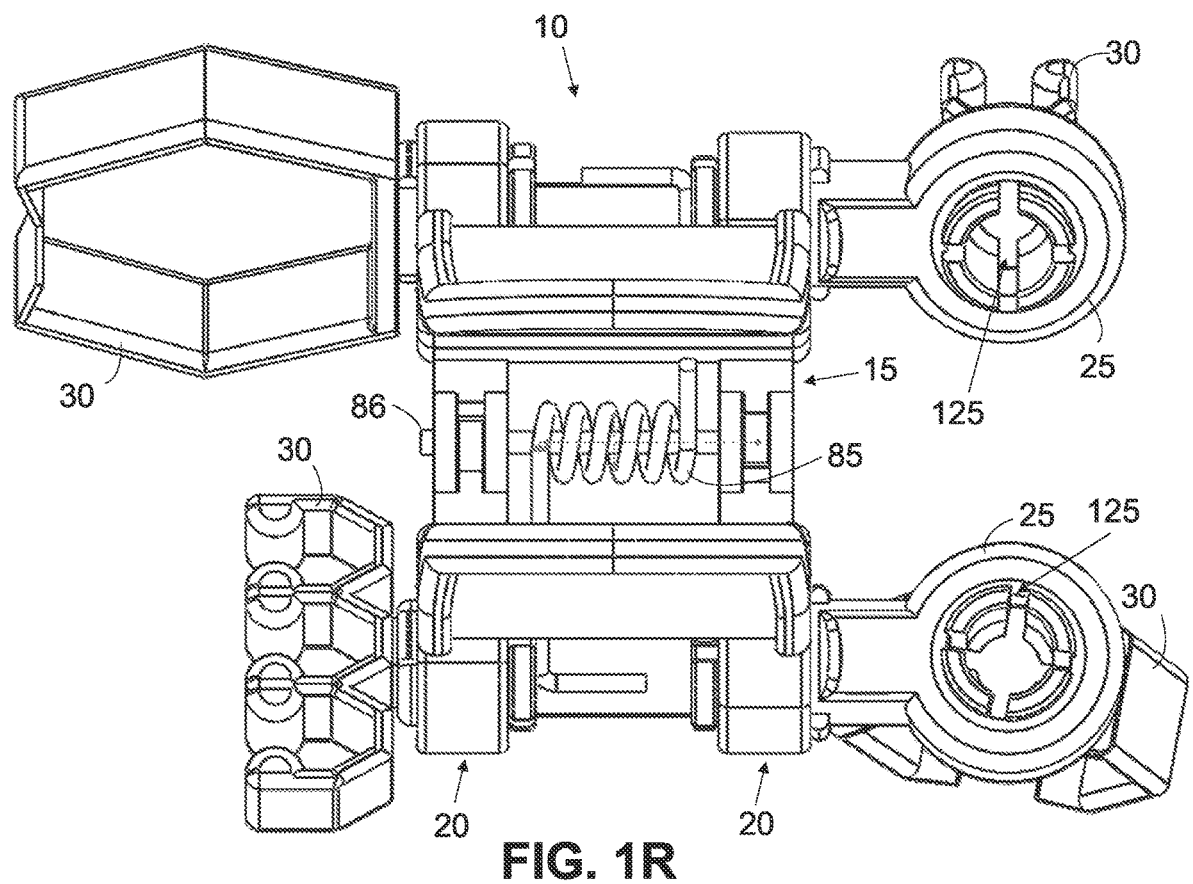
Figure 1S:
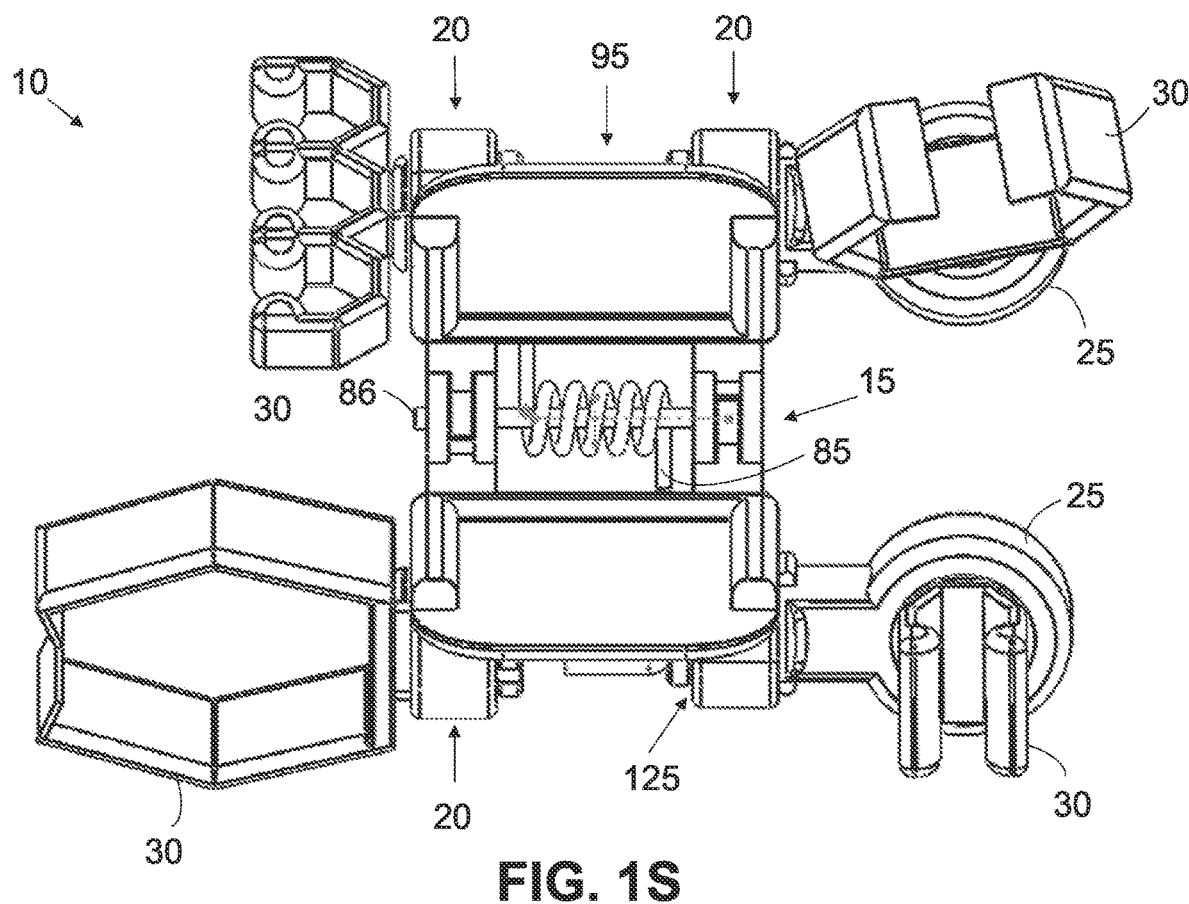
Figure 1T:
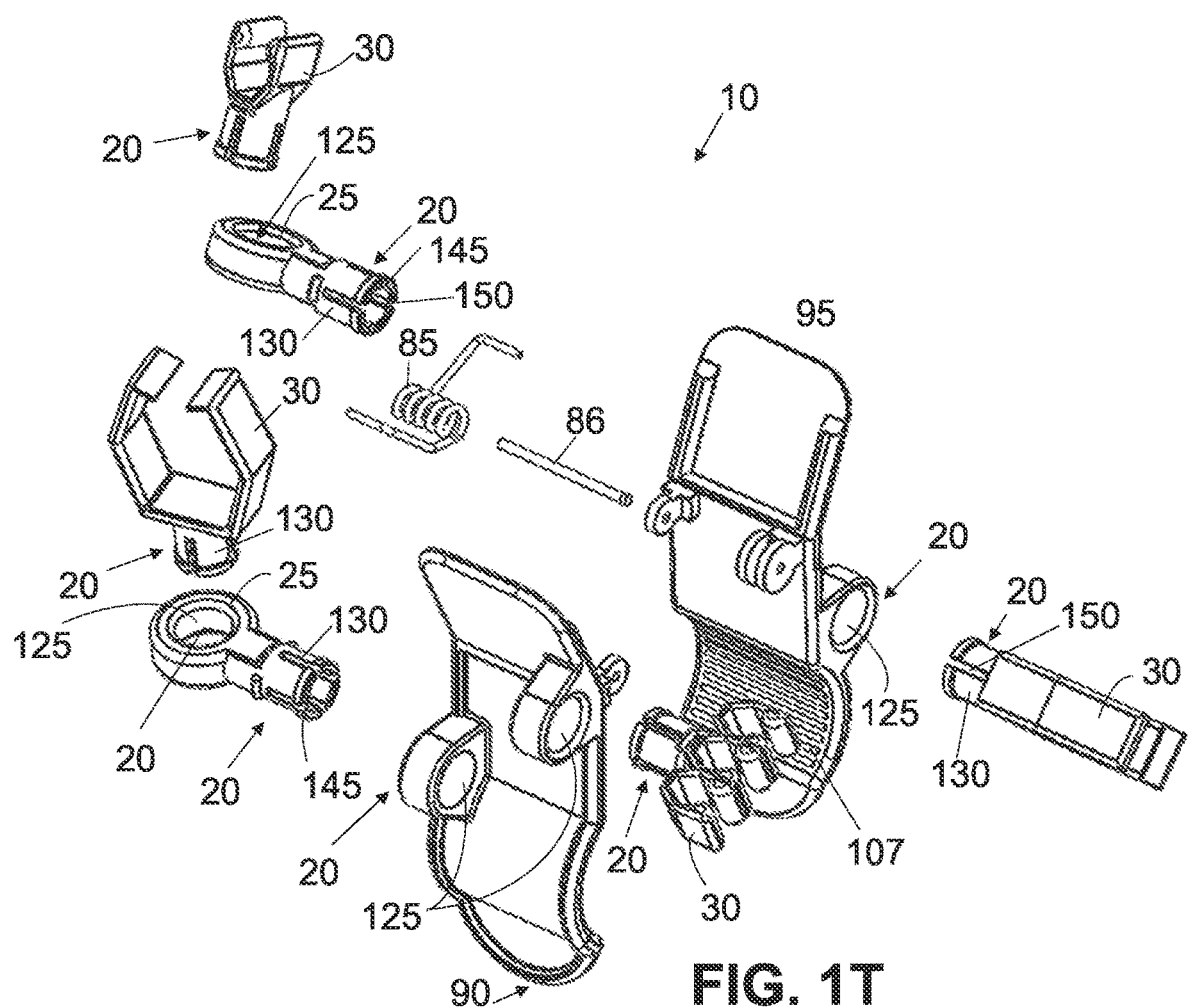
Figure 1U:
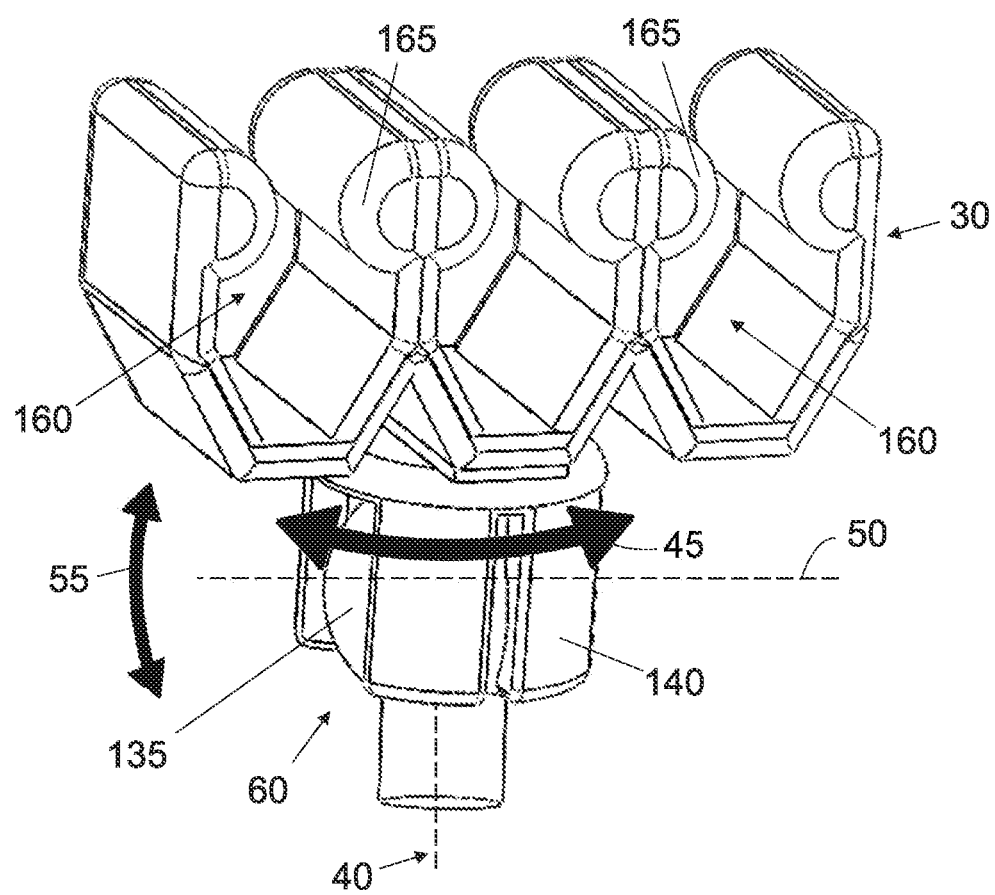
FIGS. 1U-1W illustrate various views of a coupling system, according to some embodiments.

By way of non-limiting illustration, FIGS. 1A and 1C show that, in some embodiments, the adapter bracket 25 is able to rotate around a first axis 40 (as shown by arrow 45), while the clip 30 is able to rotate about a second axis 50 (as shown by arrow 55). Additionally, FIG. 1P shows that, in some embodiments, a first clip 32 is able to pivot about just one axis (e.g., axis 50) with respect to the clamp 15 (e.g., by not being coupled to an adapter bracket 25) while a second clip 34 is able to rotate and/or pivot about the first axis 40 and the second axis 50 (e.g., through the use of the adapter bracket 25). Moreover, FIG. 1U shows an embodiment in which the clip 30 is able to rotate about the first axis 40 and the second axis 50, as shown by arrows 45 and 55 (e.g., via the use of a ball and socket joint 60 coupling system).

With specific reference now to the clamp 15, the clamp can perform any suitable function, including, without limitation, supporting one or more clips 30, adapter brackets 25, and/or tubes/cords 35, as well as securing such objects to one or more support structures. In this regard, the clamp can clamp onto and/or otherwise be selectively and/or permanently coupled to any suitable structure that is capable of supporting the clamp and the components attached thereto. Some examples of suitable support structures include, but are not limited to, one or more IV poles, bed rails, wheelchairs, walkers, canes, cabinets, shelves, doors, side tables, medical structures, non-medical structures (e.g., bathroom rails, sink edges, shower doors or curtain rods, etc.), patient hospital gowns, bedding, and/or any other suitable support. By way of non-limiting illustration, FIG. 1E shows an embodiment in which the clamp 15 is selectively coupled to an IV pole 65 while FIG. 1F shows an embodiment in which the clamp 15 is coupled to a bed rail 70.

The clamp 15 can comprise any suitable device or type of clamp that is capable of holding one or more adapter brackets 25, clips 30, and/or tubes/cords 35 and/or coupling such objects to a support structure (e.g., an IV pole 65, a bed rail 70, and/or any other suitable support structure). Indeed, in some embodiments, the clamp comprises one or more spring clamps, spring-loaded clamps, C-clamps, G-clamps, bessey clutch style bar clamps, hose clamps, bessey clamp F-style sliding arm clamps, kant-twist cantilever clamps, kant-twist clamps, locking clamps, locking pliers, quick release bar clamps, parallel clamps, bar clamps, scaffold cheeseborough clamps, global truss clamps, three prong adjustable clamps, gear bar clamps, I-bolt clamps, pipe clamps, super clamps, crab-shaped clamps, locking chain clamps, edge clamps, mechanical clamps, scissor clamps, sash clamps, pinch dog clamps, merman clamps, quick action clamps, hand screw clamps, screw clamps, trigger clamps, speed clamps, quick grip clamps, cardellini clamps, cable clamps, clamps including one or more threaded engagements, clamps including one or more grooves or recesses that are configured to receive a portion of a support structure, frictional engagements, mechanical engagements, devices having one or more flexible members that are configured to be deformed and wrapped around a portion of a support structure, hook, straps, and/or any other suitable device that is capable of holding one or more adapter brackets, clips, and/or tubes/cords to a support structure. By way of non-limiting illustration, FIGS. 1A-1T show that some embodiments of the clamp 15 comprise a spring clamp or a spring-loaded clamp. In some such embodiments, a user (e.g., a nurse, a doctor, a medical assistant, etc.) may be able to manually open the clamp by squeezing one or more features of the clamp (e.g., one or more handle portions of the clamp) and attach or remove the clamp to or from a support structure (e.g., a hospital bed). Thus, in some embodiments, the clamp can be quickly and easily transferred from one structure (e.g., a bed rail 70) to another structure (e.g., an IV pole 65).

Where the clamp 15 comprises a spring clamp, the clamp can comprise any suitable type of spring and/or other resilient member that is cable of allowing the clamp to function as described herein. In this regard, some non-limiting examples of suitable types of springs include one or more resilient clips, resilient brackets, resilient members, springs, torsion springs, coil springs, flat springs, compression springs, extension springs, helical springs, machined springs, disk springs, leaf springs, variable-rate springs, serpentine springs, V-type springs, U-type springs, and/or any other suitable object that is capable biasing one portion of the clamp towards another portion of the clamp. By way of non-limiting illustration, FIGS. 1R-1S show that in some embodiments in which the clamp 15 comprise a first member or arm 75 and a second member or arm 80, one or more tension springs 85 are used (e.g., in connection with one or more pins, rivets, couplers, and/or any other suitable fastener 86 or fasteners) to bias a first end portion 90 of the first 75 and second 80 members together, while biasing a second end portion 95 of the first 75 and second 80 members apart. Additionally, FIGS. 1L-1N show that in some embodiments in which the clamp 15 comprises the first member 75 and the second member 80, one or more V-type springs 100 are used to bias the first end portions 90 of the first 75 and second 80 members together, while biasing the second end portions 95 of the first 75 and second 80 members apart. Additionally, FIGS. 6A-6D show that, in some embodiments, the clamp 15 comprises one or more torsion springs 101 (e.g., a torsion-spring-like bent rod).

In some embodiments, in addition to and/or in place of biasing the first end portion 90 of a first member 75 towards the first end portion of the second member 80, one or more objects (e.g., V-type springs, resilient members, adapter brackets 25, clips 30, and/or any other suitable object or objects can be used to hold the first and second members together). Indeed, as shown by FIGS. 1L-1N, some embodiments of the system 10 comprise one or more V-type springs 100 and/or any other suitable resilient member that helps hold the first 75 and second 80 members of the clamp 15 together. In this regard, in addition to and/or in place of such a resilient member, the first and second member of the clamp may be interfaced together in any suitable manner, including, without limitation, by one or more hollow cylinders 105 formed by one piece of the clamp (e.g., the first or second member) and one or more interfacing arcs 110 formed by another piece of the clamp (e.g., the other of the first or second member) to interface with the hollow cylinder. While the clamp can have any suitable number of such hollow cylinders and interfacing arcs, and while such cylinders and arcs can be disposed in any suitable locations and in any suitable configurations, FIG. 1N shows that, in some embodiments, the clamp 15 comprises two cylinders 105 and two arcs 110, the orientation of such elements being transposed from one side of the clamp to another.

While the hollow cylinder 105 and interfacing arc 110 (e.g., as shown in FIGS. 1L-1M) can perform any suitable function, in some cases, they act as a hinge of the clamp 15. Additionally (and as discussed below in more detail), in some embodiments, the cylinder 105 and arc 110 provide one or more points of attachment for one or more adapter brackets 25 and/or clips 30 (e.g., the cylinder acts as a coupling system component 20, as shown in FIGS. 1L-1N).

In addition to the aforementioned components and characteristics, the clamp 15 can comprise any other component and characteristic that allow it to function as described herein. For instance, some embodiments of the clamp comprise one or more hooks, straps, catches, holes, teeth, wires (e.g., rigid wires in geometrical configurations, deformable wires, superelastic or shape memory wires, and/or any other suitable type of wires), detachable lids, and/or any other suitable features that allow the clamp to be hung or otherwise attached (e.g., from an IV pole 65, from another hook, and/or any other suitable support) to quickly move the organization system 10, to organize tubes/cords, to store the system, and/or for any other suitable purpose.

As another example of a suitable characteristic of the clamp 15, some embodiments of the clamp have a first end portion 90 of the first 75 and/or second 80 members that is relatively straight (e.g., such that only tip portions of the straight first and/or second members contact each other when the clamp is at rest, without anything being disposed therein). In some other embodiments, however, the first end portion of the first and/or second members include one or more indentations, recesses, depressions, channel, arcs, and/or other groove of any suitable shape, including, without limitation, be substantially circular, V-shaped, U-Shaped, polygonal, irregular, symmetrical, asymmetrical, and/or any other suitable shape. By way of non-limiting illustration, FIGS. 1A-1B show some embodiments in which the first end portion 90 (or a portion on the side of the clamp's pivot joint that is biased towards a closed position) of the first 75 and second 80 member includes a circular groove 115 and/or substantially straight grasping tips 120. In some such embodiments, pressure exerted on the handles, paddles, and/or any other suitable part of the second end portion 95 of the first and/or second member (e.g., by a user) can open the tips. In some embodiments, the circular (and/or any suitably shaped) groove is designed to grasp one or more common hospital structures (e.g., IV poles, hospital beds, etc.) and/or any other substantially cylindrically shaped structures. In some embodiments, one or more grooves or a geometry of the clamp allow an open space, for tubes/cords to be "quick clamped" such that the tubes/cords can pass through freely while the end of the clamp grasps onto to a structure.

As yet another example of a suitable characteristic of the clamp 15, some embodiments of the clamp optionally include one or more teeth (e.g., teeth structures); coated contact surfaces (e.g., plastic-dipped, rubber-dipped, adhering gripping material, and/or any other suitable coatings or added materials applied to portions of the clamp for increased grip); knurled surfaces; adhered surfaces that provide increased friction, traction, and/or Van der Waals force to one or more contact surfaces of the clamp; magnets; and/or any other suitable feature that provides the first end portion 90 (e.g., one or both grasping tips 120) and/or any other suitable portion of the clamp with an increased ability to grip, frictionally engage, and/or otherwise hold on to a support structure. By way of non-limiting illustration, FIG. 1T shows an embodiment in which an inner surface of one or both of the first end portions 90 of the first 75 and second 80 members comprise a surface (e.g., a rubberized surface and/or any other surface having an increased ability to grip) that includes one or more raised ridges 107.

Figure 7A:
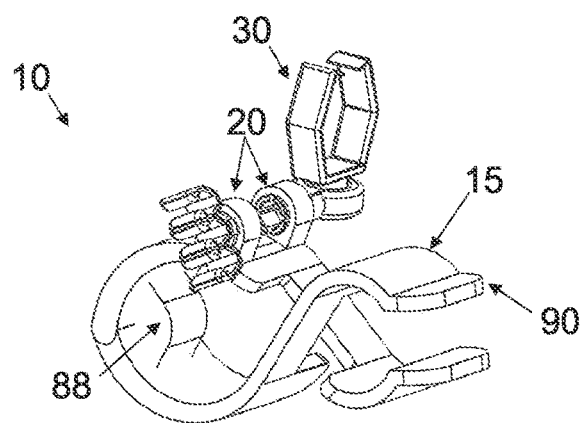
FIGS. 7A-7C illustrate some views of additional embodiments of the tube and cord organization system.
Figure 7B:
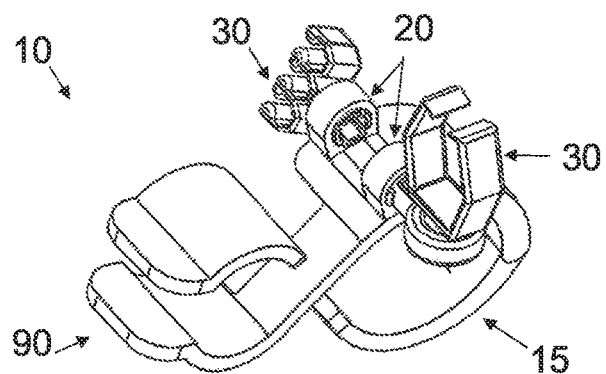

As yet another example of a suitable characteristic of the clamp 15, some embodiments of the clamp include a single piece of material, where the two clamp sides are connected together to act also as the spring, as a compliant mechanism (e.g. a reverse tweezer design). By way of non-limiting illustration, FIGS. 7A-7B show some embodiments where both sides of the clamp are connected via one or more protruding connectors 88.

Turning now to the coupling system components 20, some embodiments of the organization system 10 comprise one or more coupling systems and/or coupling system components that are configured to couple (directly or indirectly) one or more clips 30 to one or more adapter brackets 25 and/or one or more adapter brackets 25 and/or clips 30 to the clamp 15. In some such embodiments, one or more clamps, brackets, and/or clips are permanently coupled together (e.g., via one or more pivot joints, hinges, welds, integrally formed components, fasteners, adhesives, and/or in any other suitable manner).

Figure 1V:
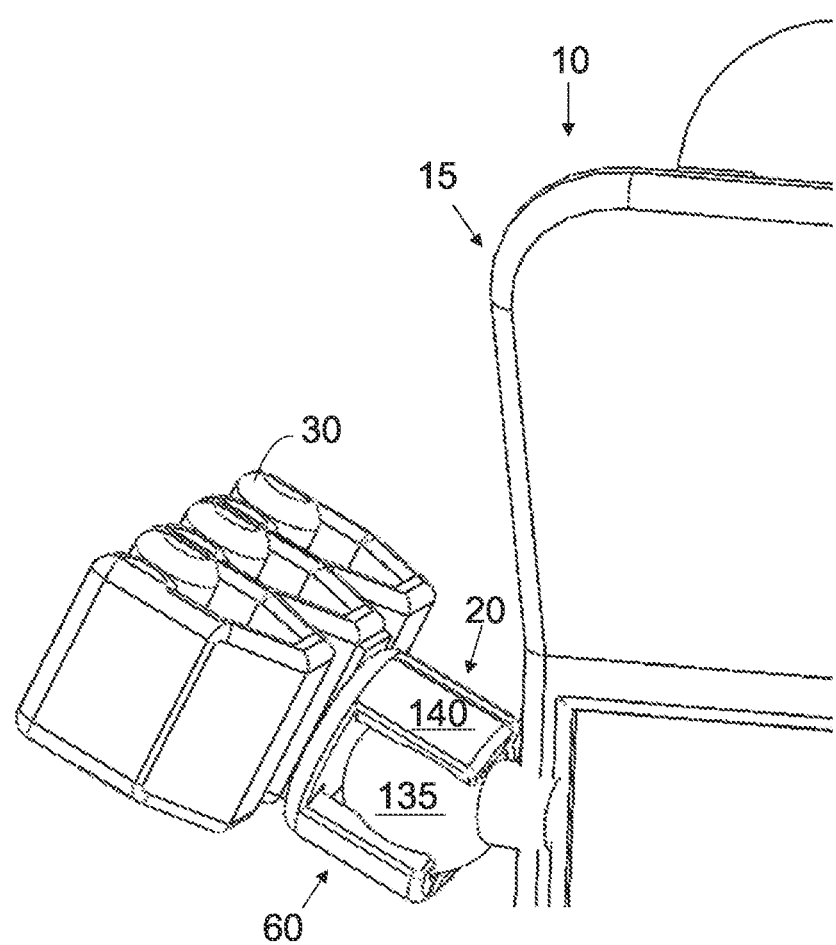
Figure 1W:
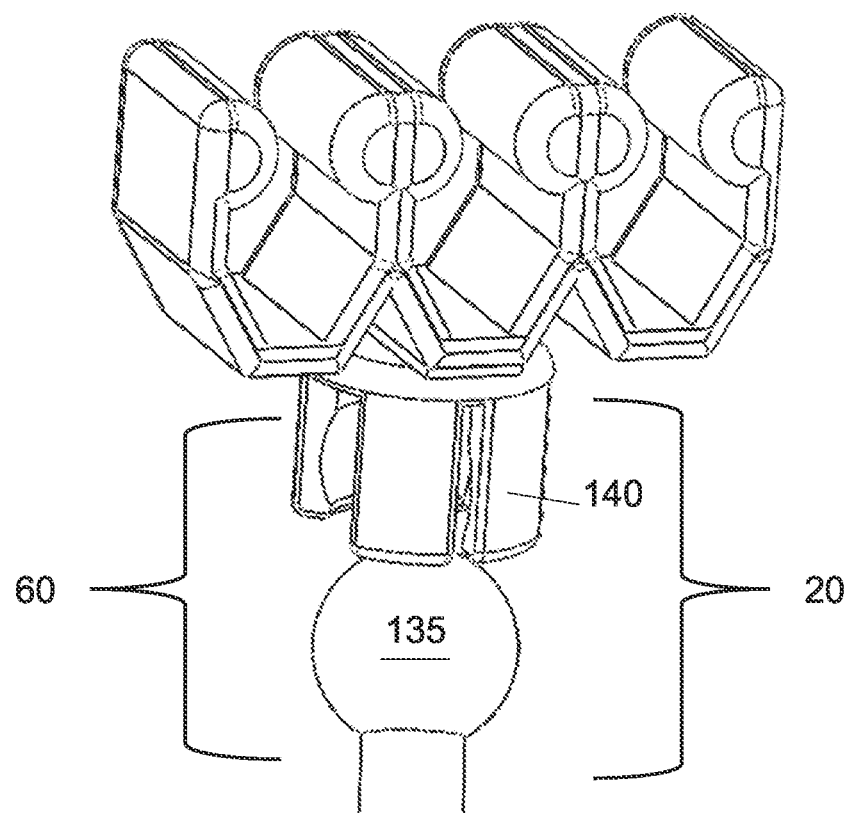
Figure 2A:
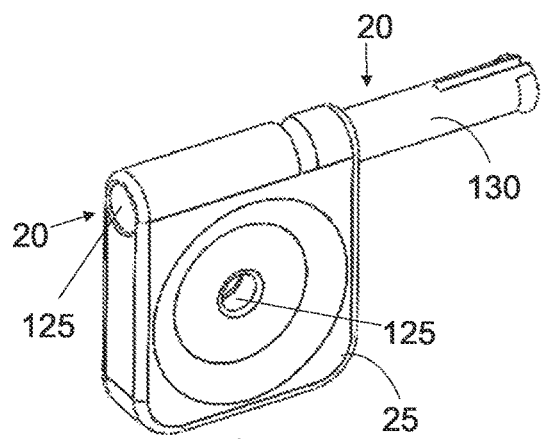
FIGS. 2A-2D illustrate various views of an adapter bracket of the tube and cord organization system, according to some embodiments.
Figure 2B:
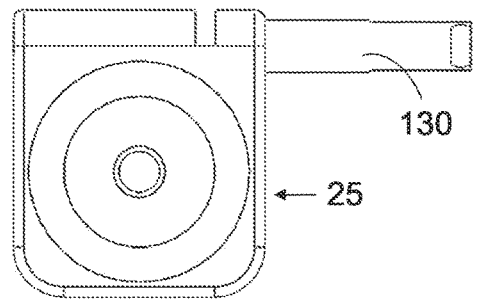
Figure 2C:
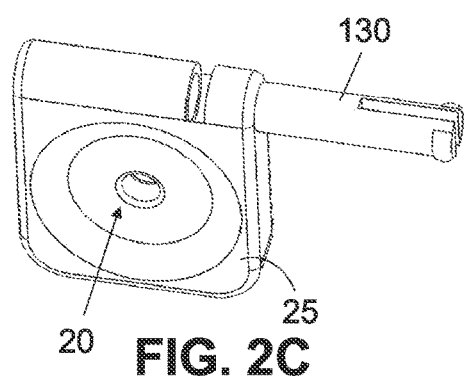
Figure 2D:
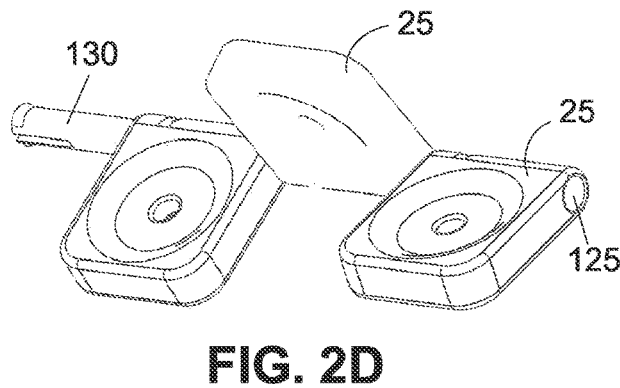

In some embodiments, however, the clamp 15, adapter bracket 25, and/or clip 30 are configured to be selectively coupled to and/or decoupled from each other. In this regard, the clamp, adapter bracket, and/or clip can each include any suitable type of coupling system component or coupler that allows one or more portions of the system 10 to be selectively coupled together and decoupled from each other. Some non-liming examples of such couplers, include, without limitation, one or more recesses, receiving holes, projections, processes, shafts, mating couplers, seats, balls, sockets, snaps, studs, joints, pins, frictional engagements, mechanical engagements, catches, fasteners, wire lock pins, quick release pins, magnets, universal joints, detent mechanisms, wire rings, hook and look fasteners, screws, threaded engagements, slots, adhesives (e.g., tape, glue, and/or any other suitable adhesive), and/or any other suitable coupler or couplers. Indeed, in some embodiments, the clamp, adapter bracket, and/or clip each comprise one or more receiving holes (or recesses) and/or one or more mating protrusions (or shafts, cylinders, and/or any other suitable type of processes). By way of non-limiting illustration, FIGS. 1L-1T show some embodiments in which the system 10 comprises one or more receiving holes 125 and/or protrusions 130. In some embodiments, however, the system comprises one or more ball couplers and socket couplers. By way of non-limiting illustration, FIGS. 1U-1W show some embodiments in which the system 10 comprises one or more ball couplers 135 and/or socket couplers 140.

Where the system 10 comprises one or more receiving holes 125, protrusions 130, ball couplers 135, socket couplers 140, and/or any other suitable couplers, such couplers can be disposed at, in, and/or on any suitable component of the system. Indeed, in some embodiments, the clamp, adapter bracket, and/or clip each have one or more receiving holes, protrusions, ball couplers, and/or socket couplers. In accordance with some embodiments, however, FIGS. 1L-1N and 10 show some embodiments in which the clamp 15 defines (or comprises a coupler or coupler system component 20) that defines one or more receiving holes 125 (e.g., for receiving one or more protrusions 130 from one or more adapter brackets 25 and/or clips 30). Additionally, FIGS. 1A and 1C show some embodiments in which the adapter bracket 25 comprises one or more receiving holes 125 (e.g., for receiving one or more clips and/or other adapter brackets 25). Moreover, FIGS. 1U-1V shows an embodiment in which the clamp 15 comprises one or more ball couplers 135 (e.g., for coupling with one or more socket couplers 140 on one or more clips 30, adapter brackets 25, and/or other clamps 15). Furthermore, FIGS. 2A-2D show some embodiments in which the adapter bracket 25 comprises one or more protrusions 130 (e.g., for mating with one or more receiving holes 125 in the clamp 15 and/or another adapter bracket 25). In this regard, FIG. 1A shows that, in some embodiments, one or more adapter brackets 25 are selectively coupled together (e.g., end to end, to form a chain, and/or in any other suitable manner) to tailor the system 10 to organize any desired collection of tubes/cords. Moreover, FIGS. 3A-3D show some embodiments in which the clip 30 comprises one or more protrusions 130 that are configured to couple the clip 30 to one or more adapter brackets 25 (e.g., as shown in FIG. 1A) and/or clamps 15 (e.g., as shown in FIG. 1O).

Where the system 10 comprises one or more coupling system components 20 (e.g., receiving holes 125, protrusions 130, ball couplers 135, socket couplers 140, and/or any other suitable couplers), the clamp 15, adapter bracket 25, and/or clip 30 can have any suitable number of coupling system components, including, without limitation, 1, 2, 3, 4, 5, 6, or more. For instance FIG. 2A shows non-limiting illustration in which each adapter bracket 25 comprises two receiving holes 125 (e.g., one in a face and one in an end, perimeter, and/or in any other suitable location). Thus, in some such embodiments, the adapter bracket can receive a protrusion 130 of the clip and/or of another adapter bracket. In another non-limiting illustration, FIGS. 1L-1N show some embodiments in which the clamp 15 comprises two coupling system components 20 (e.g., receiving holes 125), with one being disposed at each side of the clamp 15. In another non-limiting illustration, however, FIG. 1Q shows an embodiment in which the clamp 15 defines (or has coupler components 20 that define) four receiving holes 125.

In some embodiments in which the system 10 comprises one or more coupling system components 20 (e.g., receiving holes 125, protrusions 130, ball couplers 135, socket couplers 140, and/or any other suitable couplers), one or more of the coupling system components are sized and/or shaped to only couple to one or more other specific coupling system components. For instance, in some embodiments, a protrusion 130 has a large diameter that permits it to fit in some receiving holes 125, but not in others. Thus, in some such embodiments, the system is configured to prevent some pieces of the system (e.g., one or more clamps, adapter brackets, and/or clips) from coupling with one or more other pieces of the system.

In some embodiments, however, one or more coupling system components 20 of the clamp 15, the adapter bracket 25, and/or the clip 30 are sized and shaped to couple with multiple other pieces of the system 10 (e.g., the protrusion 130 from any component with a protrusion (such as the adapter or clip) fitting into the receiving hole 125 of any component having the receiving hole). By way of non-limiting illustration, FIG. 1T shows an embodiment in which the protrusions 130 of the adapter bracket 25 and the clip 30 each have the same (or a substantially similar) outer diameter, such that both the adapter bracket 25 and the clip 30 are configured to couple directly to the clamp 15 and such that the clip 30 can couple directly with the adapter bracket 25.

In some embodiments, one or more of the coupling system components 20 are configured to selectively lock (or be secured) to and/or capture one or more other coupling system components. In this regard, the various coupling system components can selectively lock together in any suitable manner, including, without limitation through the use of one or more projections, catches, detents, quick release mechanisms, frictional engagements, mechanical engagements, magnets, wire rings, hook and loop fasteners, slots, screws, threaded engagements, adhesives (e.g., tape, glue, etc.), and/or in any other suitable manner. Indeed, in some embodiments, one or more of the clamp 15, the adapter bracket 25, the clip 30, the receiving hole 125, the protrusion 130, the ball coupler 135, the socket coupler 140, and/or any other suitable portion of the system 10 comprises one or more projections and/or indentations that are configured to help selectively lock two coupling system components together (e.g., a protrusion within a receiving hole). Where the system comprises one or more projections that are configured to help selectively lock two or more coupling system components together, such projections can have any suitable shape (including without limitation, being ring shaped, comprising a raised ridge, comprising a raised edge, comprising a hook, comprising a wedge and/or frictional wedge-like geometry to press fit, comprising a screw and/or other threaded engagement, comprising a bump, and/or any other suitable shape) and can be in any suitable location. By way of non-limiting illustration, FIG. 1T shows an embodiment in which the protrusion 130 of the adapter bracket 25 and/or the clip 30 comprises one or more projections 145 comprising a raised edge and/or ring-like structure. Additionally, FIG. 1T shows that, in some embodiments, the protrusion 130 of the adapter bracket 25 and/or clip 30 comprise one or more slots 150 that allow a tip of the protrusion 130 to comply (e.g., bend, deform, etc.) as the protrusion 130 is inserted into a receiving hole 125 of the clamp 15 and/or another adapter bracket 25. In some embodiments, the tip may lock in the receiving hole (e.g., via the projection) when the protrusion is fully inserted into the receiving hole (e.g., such that the projection expands as it passes through the receiving hole and/or into an opening 155 (as shown in FIG. 2A)). In some such embodiments, after the protrusion has been pushed fully into the receiving hole such that the projection is engaged to help lock the protrusion in place, the protrusion and anything attached to it (e.g., an adapter bracket and/or a clip) can be quickly released from the receiving hole when sufficient force is applied to pull the protrusion from the receiving hole.

With additional reference now to the adapter bracket 25, the adapter bracket can have any suitable component or characteristic that allows it to couple to the clamp 15 and/or to one or more clips 30 and/or other adapter brackets. Thus (as previously described), some embodiments of the adapter comprise 1, 2, 3, 4, 5, 6, or more coupling system components 20 (e.g., protrusions 130 and/or receiving holes 125). By way of non-limiting illustration, FIGS. 2A-2D and 1T show some embodiments in which the adapter bracket 25 comprises one or more receiving holes 125 and/or protrusions 130. In this regard, while FIGS. 2A-2D and 1T show some embodiments in which the adapter bracket defines one receiving hole 125 in a face of the bracket (e.g., for a clip 30), in some other embodiments, the adapter bracket is elongated and defines a plurality of receiving holes in a face (e.g., to allow the adapter bracket to couple with multiple clips).

With additional reference now to the clip 30, the clip can have any suitable characteristics that allow it to hold one or more tubes/cords 35 and that allows it to couple to an adapter bracket 25 and/or the clamp. Thus (as previously described), some embodiments of the clip include one or more coupling system components 20 (e.g., receiving holes 125, protrusions 130, ball couplers 135, socket couplers 140, and/or any other suitable couplers). As a result, in some embodiments, the clip may be quickly removed from the adapter bracket and/or clamp (e.g., by a practitioner) in an emergency situation to avoid patient harm (e.g., pulling a tube from a patient, etc.). In some such embodiments, the clip can be pulled from the adapter bracket and/or clamp by a force similar in magnitude to a force used to insert an end of the clip into the hole formed in the adapter bracket or clamp. Indeed, in some cases, the clip can be pulled from the adapter bracket and/or clamp should a tube/cord retained by the clip be caught (and/or tangled) so that the tube/cord is not pulled from the patient. Additionally, in some embodiments, the tube/cord may be quickly pulled from the clip.

Figures 4A, 4B:
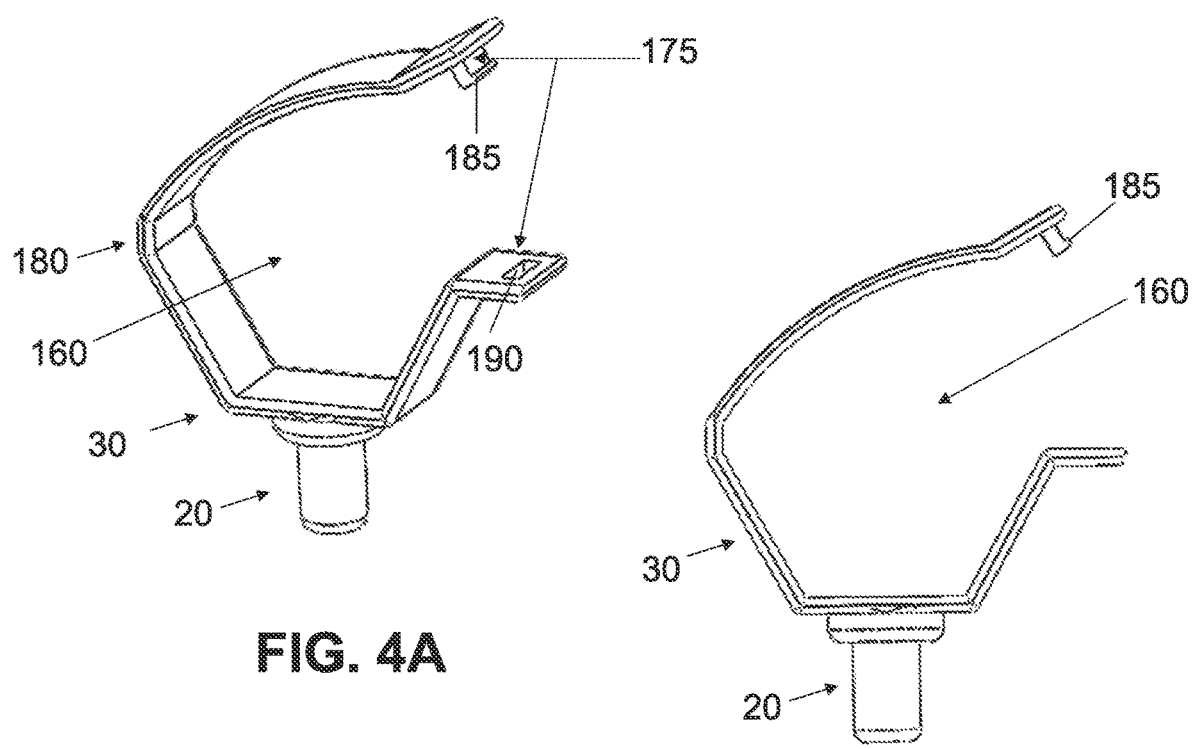
FIGS. 4A-4B illustrate various views of a latching clip of the tube and cord organization system, according to some embodiments.
Figure 5A:
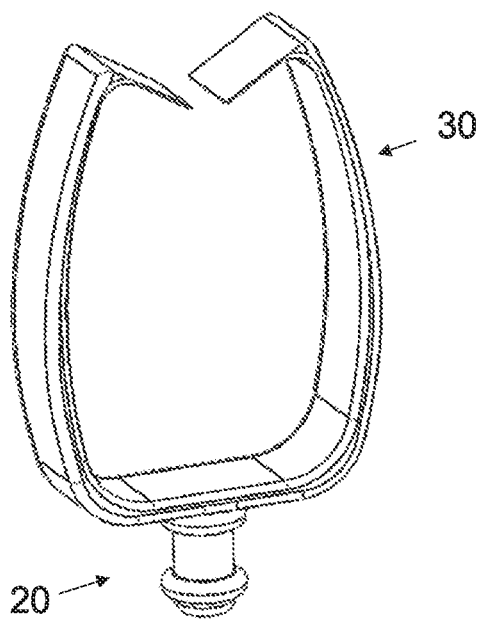
FIGS. 5A-5D illustrate some views of a compliant trap clip of a tube and cord organization system, according to certain embodiments.
Figure 5B:
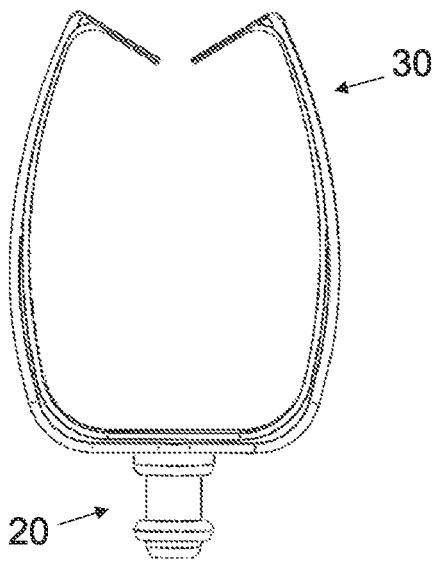
Figure 5C:
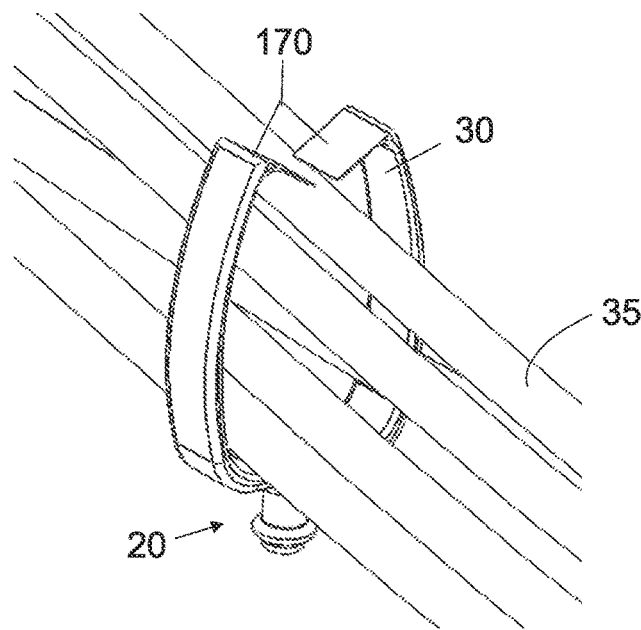
Figure 5D:
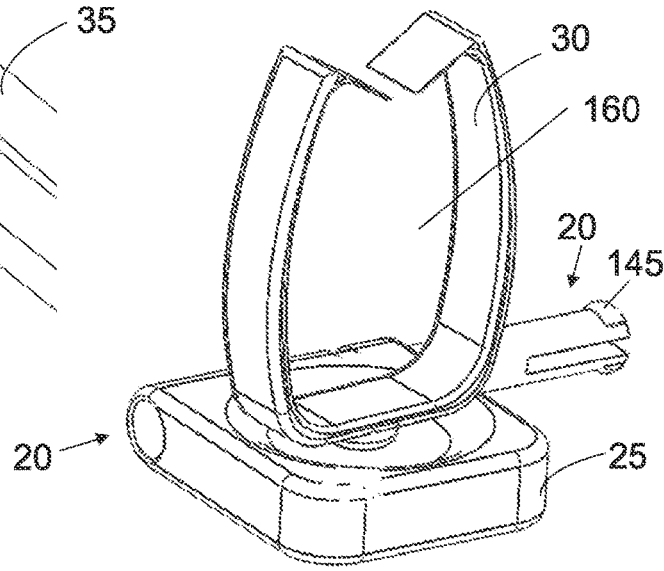

With respect to the clip's ability to hold one or more tubes/cords 35, the clip 25 can have any suitable feature that allows it to perform such a function. For instance, some embodiments of the clip include 1, 2, 3, 4, 5, 6, or more tube/cord receptacles (e.g., as illustrated by the receptacles 160 in FIGS. 1U and 3A-5D). Additionally, the clip (and/or its receptacles) can have any suitable shape and be any suitable size that allows the clip to accommodate any desired type and/or number of tubes/cords 35. For example, some embodiments of the clip have one or more relatively large receptacles that are configured to secure one or more large-diameter tubes/cords. In another example, some embodiments of the clip comprise one or more receptacles that are relatively small so as to secure one or more small-diameter tubes/cords. In a further example, some embodiments of the clip 30 (e.g., as shown at FIGS. 1U and 5C) form one or more receptacles 160 that are sized and/or shaped to secure a bundle of tubes/cords 35).

Figure 3A:
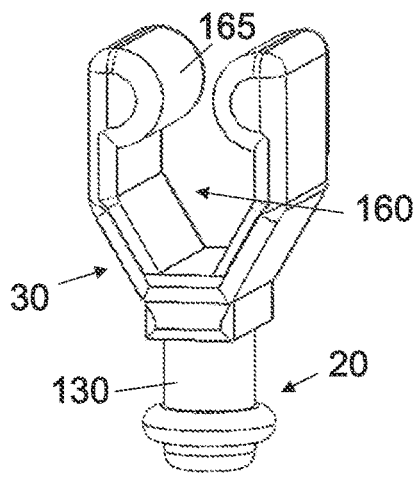
FIGS. 3A-3D illustrate various views of some U-shaped clips of the tube and cord organization system, according to some embodiments.
Figure 3B:
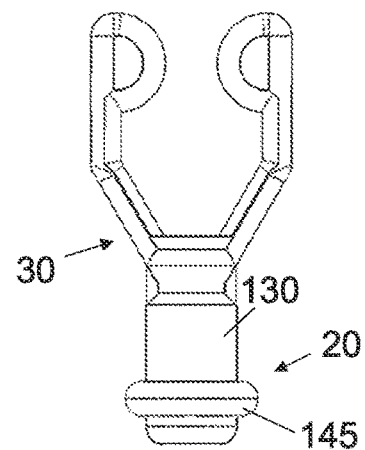
Figure 3C:
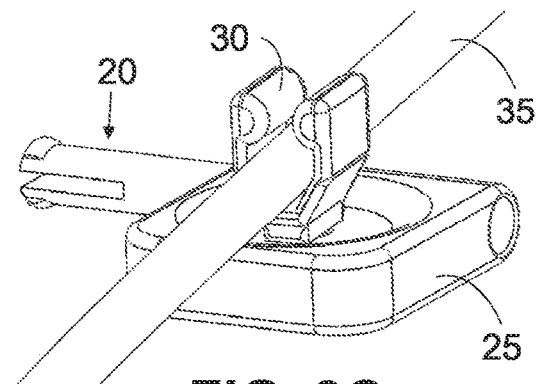
Figure 3D:
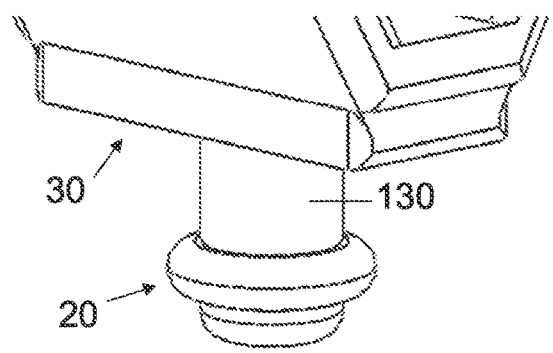

While the clip 30 and its one or more receptacles 160 can have any suitable shape, FIGS. 3A, 3B, and 1U show that, in some embodiments, the clip 30 has a U-shaped receptacle 160 that is configured to receive one or more tubes/cords 35. As another example, in some embodiments in which clip and its receptacle comprise an opening (and/or a mouth), the clip includes one or more narrowings, bumps, protrusions, hooks, ridges, and/or other objects that are configured to help selectively retain one or more tubes/cords in the clip. By way of non-limiting illustration FIGS. 3A and 1U show some embodiments in which the clip 30 has a U-shaped receptacle 160, the clip 30 further includes one or more catches 165 that are configured to selectively retain one or more tubes/cords within the receptacle 160.

While some embodiments of the clip 30 are rigid, some other embodiments of the clip include one or more compliant portions that are configured to elastically deform. For example, the sides of some embodiments of the U-shaped clip bend or flex as one or more tubes/cords are pressed into the 'U' past the one or more catches 165.

In some embodiments, the clip 30 forms a trap-like receptacle 160. While such a receptacle can have any suitable shape (e.g., being circular, elliptical, polygonal, U-shaped, and/or having any other suitable shape), FIGS. 5A-5D show that, in some embodiments, the receptacle 160 comprises a U-shaped trap (or U-trap). In some such embodiments, at least a portion of the U-trap is compliant (e.g., may elastically deform) so as to flex when one or more tubes/cords 35 are inserted into the U-trap. For example, FIG. 5C show that some embodiments of the U-trap (or compliant trap clip) comprise one or more compliant flaps 170 at an open end of the U-trap that are configured to flex to accept tubes/cords and may subsequently bend back to an original position to retain the tubes/cords. Thus, in some embodiments, the U-trap clip is configured to allow one or more tubes/cords to be quickly and easily retained by the tube and cord organization system 10.

As another example of suitable characteristic of the clip 30, some embodiments of the clip include one or more selective closure mechanisms. In this regard, while the clip can include any suitable type of closure mechanism (including, without limitation, one or more snaps, latching mechanism, hook and loop fasteners, fasteners, clips, clasps, magnets, hook and loop fasteners, ties, adhesives, mounting adhesives, putty, sticky polymers, screws, threaded engagements, and/or any other suitable feature that allows the receptacle 160 of the clip to be selectively closed, FIGS. 4A-4B show some embodiments in which the clip 30 (or latching clip) comprises a latching mechanism 175 and/or one or more a hinge/flexible portions 180. While the latching mechanism can function in any suitable manner, in some embodiments, it comprises a latching clip that is configured to elastically deform to allow for the latching of the receptacle. In some such embodiments, a tongue 185 of the latching mechanism is configured to be received by an opening 190 (as shown in FIG. 4A) to securely latch the clip and secure one or more tubes/cords therein. Additionally, in some such embodiments, the latching mechanism is configured to quickly be released when pulled by a user and/or when a sufficient amount of force is applied to the clip by one or more tubes/cords.

As yet another example of a suitable characteristic of the clip 30, some embodiments of the clip include one or more teeth within a single receptacle 160 to separate one or more tubes/cords. In this regard, the teeth can have any suitable characteristic, including, without limitation, being relatively short, being relatively long, being straight, having a curved end, being soft, being resilient, being rigid, being relatively rounded, changing shape along their length (e.g., initially thin with wider ends, alternating between being wide and thin, and/or in any other suitable manner), and/or having any other suitable characteristic that allows them to secure and/or separate one or more tubes/cords.

As yet another example of a suitable characteristic of the clip 30 and/or clamp 15, some embodiments of clip or clamp include a lighting mechanism (e.g. L.E.D. light strip, glow-in-the-dark material, a light, and/or any other suitable source of light) to illuminate the clip, the clamp, the adapter bracket 25, one or more cords/tubes 35, and/or a surrounding area.

As still another example of a suitable characteristic, in some embodiments, one or more portions of the clip 30 are coated or covered with one or more coating materials (e.g., rubber, plastic, and/or any other suitable coating materials), coverings, sleeves, and/or any other materials. Indeed, in some embodiments, one or more portions of the clip comprise a coating that is configured to help increase friction at a portion of the clip so as to help retain one or more tubes/cords within the receptacle 160.

As yet another example of a suitable characteristic, some embodiments of the clip 30 include one or more malleable portions (e.g., comprising wire and/or any other suitable malleable and/or pliable material) that are configured to be bent and/or twisted (e.g., by a user) to form a shape to secure one or more tubes/cords.

Figure 8A:
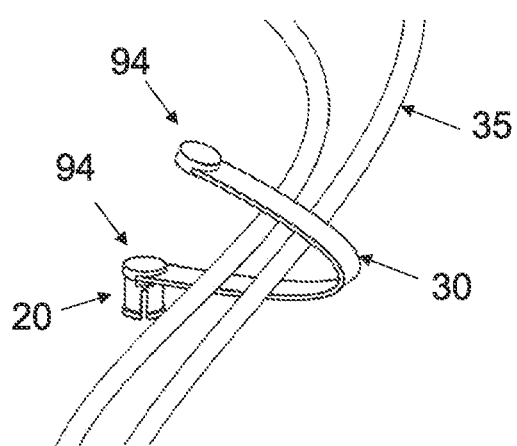
FIGS. 8A-8B illustrate views of some additional embodiments of a clip.
Figure 8B:
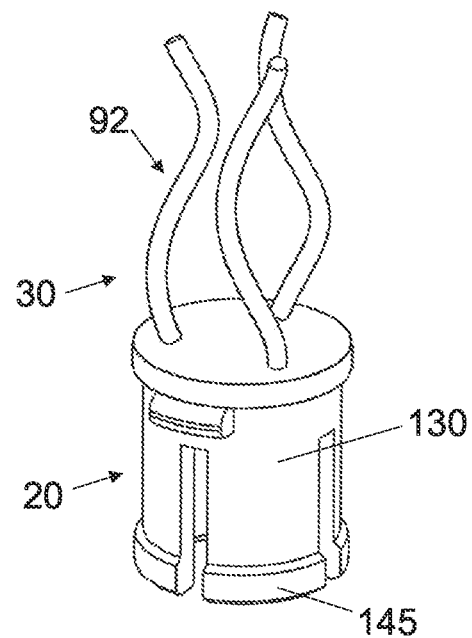

As another example, some embodiments of the clip 30 include one or more spiral fingers (see e.g., the fingers 92 FIG. 8B). In such embodiments, the spiral fingers can function in any suitable manner. For instance, the fingers can be intertwined and/or twisted together to hold one or more cables in place and/or the cables can be disposed down a channel running through a center of one or more of the fingers.

As even another example, some embodiments of the clip include one or more hooks and/or clasps that are configured to secure a tube or cord. Moreover, in some embodiments, the clip includes one or more ribbons and/or any other suitable flexible elongated members that have one or more magnetic and/or ferromagnetic end attachments that can secure one or more tubes/cords (see e.g., the clip 30 in FIG. 8A which includes at least one or more magnets and/or ferromagnetic materials 94). Additionally, in some embodiments, the clip includes one or more pieces of a sticky material (e.g., a sticky tape and/or plastic) to help secure one or more tubes/cords. In yet other embodiments, the clip includes one or more straps that are configured to be used to secure one or more tubes/cords.

Figure 7C:
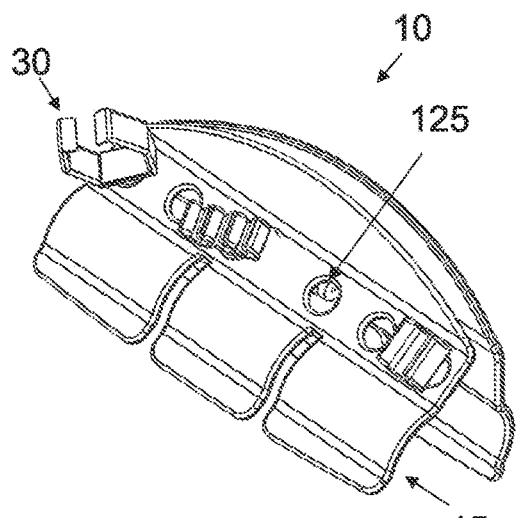

As yet another example, the clamp 15 can be elongated to be any suitable length, including without limitation, to be between 1 cm and 40 cm in length (or within any subrange thereof). By way of non-limiting illustration, FIG. 7C shows one embodiment of an elongated clamp 15.

The described organization system 10 can comprise any suitable materials that allow it to function as intended. Indeed, in some embodiments, the clamp 15, adapter bracket 25, clip 30, and/or each of their constituent parts can include, one or more types: of plastic (including, without limitation, one or more types of polyethylene terephthalate, high-density polyethylene, polyvinyl chloride, polypropylene, ultra-high-molecular-weight polyethylene, lightweight high-strength oriented-strange polyethylene gel, rubber, vulcanized rubber, nylon, and/or any other suitable types of plastics and/or polymers), metals (including, without limitation, one or more types of aluminum, steel, spring steel, iron, magnesium, metal alloys, superelastic or shape memory materials or alloys, and/or any other suitable type of metal), fiberglass, resin, wood, ceramic materials, natural materials, synthetic materials, carbon fiber, and/or any other suitable materials. Indeed, in some embodiments, the first 75 and second 80 members of the clamp, the adapter bracket, and/or the clip comprise one or more types of plastic.

The described organization system 10 can also be made in any suitable manner. In this regard, some non-limiting examples of methods for making the described organization system include molding; extruding; coating; shaping; cutting; folding; bending; rapid prototyping; vacuum forming; casting; blowing; glass blowing; laser cutting; machining (e.g. via CNC and/or in any other suitable manner); drilling; stamping; punching; connecting various pieces with one or more adhesives, mechanical fasteners (e.g., clamps, rivets, crimps, pins, brads, nails, staples, pegs, clips, screws, bolts, threaded attachments, couplers, etc.); 3D printing; additive manufacturing; assembling; and/or any other suitable method that allows the described system to be produced and to function as described herein. Indeed, in some embodiments, the first 75 and second 80 members of the clamp 15 comprise an injection molded plastic that is coupled together with one or more springs (e.g., as shown in FIGS. 6A-6D). In this regard, while the first and second members can have any suitable design and need not be identical or symmetrical, in some embodiments, such pieces are identical and/or symmetrical to aid in manufacturing.

Although the tube and cord organization system 10 is described herein with reference to applications in the medical field, the system may be used in any other suitable field. For example, some embodiments of the system can be used to organize, secure, and/or manage electrical cords in a workshop (e.g., a wood shop, a metal shop, a mechanic shop, etc.). In another example, the system can be used at venues, such as music, concert, or recording venues to secure electrical cords for music and/or sound devices (e.g., electric instruments, amplifiers, microphones, sound equipment, etc.). In another example, the system can be useful in places where electrical cords (e.g., extension cords) may pose a trip hazard, such as households, office spaces, restaurants, cafeterias, schools, universities, outdoor carnivals or events, etc.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

The terms "over," "under," "between," "beneath," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. Moreover, any component, feature, element, limitation, alternative, and characteristic from any embodiments, implementations, examples, cases, and illustrations set forth herein can be combined, mixed and matched, and/or otherwise used together in any suitable manner with any other components, features, elements, limitations, alternatives, embodiments, examples, cases, implementations, or characteristics from one or more other embodiments, implementations, cases, examples, and illustrations provided herein. Furthermore, any and all of the claims included herein can claim dependency or multi-dependency from any other claim or claims. Use of the terms "other", "different", "some", and other similar terms (e.g., "in some other embodiments") are in no case to be interpreted herein as being mutually exclusive.

In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or are clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An organization system configured to secure at least one of (i) a tube and (ii) a cord, the organization system comprising:
   a clamp that is configured to selectively clamp onto a support structure; and
   a first clip that is configured to selectively secure the at least one of (i) the tube and (ii) the cord,
   wherein the first clip couples to the clamp such that the first clip is rotatable about a first axis relative to the clamp, wherein the first clip is selectively coupled to the clamp via a snap fit.

2. The organization system of claim 1, further comprising a first adapter bracket, wherein the first clip is configured to rotatably couple to the first adapter bracket such that the first clip is rotatable about a second axis relative to the first adapter bracket, and wherein the first adapter bracket is configured to rotatably couple to the clamp such that the first adapter bracket and the first clip are rotatable about the first axis.

3. The organization system of claim 1, wherein the first clip is selectively coupled to the clamp via a coupling system, and wherein the coupling system comprises a ball and socket joint.

4. The organization system of claim 1, wherein the first clip is selectively coupled to the clamp via a snap fit coupling system, and wherein the snap fit coupling system comprises a protrusion that is selectively and rotatably received within a recess.

5. The organization system of claim 4, wherein the clamp defines the recess, wherein the protrusion is directly coupled to at least one of (i) the first clip and (ii) an adapter bracket that couples with the first clip such that the protrusion is configured to rotatably couple in the recess, and wherein the snap fit coupling system further comprises a projection that is biased to selectively lock the at least one of (i) the first clip and (ii) the adapter bracket in the recess.

6. The organization system of claim 1, wherein the clamp comprises a first arm and a second arm that are pivotally coupled together, wherein a first end portion of the first arm is biased towards a first end portion of the second arm, wherein the first end portion of the first arm defines an indentation that is configured to receive a portion of the support structure and to pinch the portion of the support structure between the first end portion of the first arm and the first end portion of the second arm when the portion of the support structure is disposed within the indentation.

7. The organization system of claim 1, further comprising a first adapter bracket, wherein the first clip is configured to rotatably couple to the first adapter bracket such that the first clip is rotatable about a second axis relative to the first adapter bracket, wherein the first adapter bracket is configured to rotatably couple to the clamp such that the first adapter bracket and the first clip are rotatable about the first axis, wherein the first adapter bracket is configured to selectively and rotatably couple to a second adapter bracket that is configured to selectively and rotatably couple with a second clip that is configured to selectively secure the at least one of (i) the tube and (ii) the cord.

8. The organization system of claim 2, wherein the first adapter bracket is configured to selectively and rotatably couple to a second adapter bracket that is configured to rotatably couple with a second clip.

9. The organization system of claim 1, wherein the first clip is configured to be selectively closed to selectively secure the at least one of (i) the tube and (ii) the cord within the first clip.

10. An organization system configured to secure at least one of (i) a tube and (ii) a cord, the organization system comprising:
 a clamp having a first arm and a second arm, wherein a first end portion of the first arm is biased against a first end portion of the second arm such that the clamp is configured to selectively clamp onto a support structure when the support structure is disposed between the first end portion of the first arm and the first end portion of the second arm;
 a first clip that is configured to selectively secure at least one of (i) the tube and (ii) the cord;
 a first coupling system that rotatably and selectively couples the first clip to the clamp via a snap fit such that the first clip is rotatable about a first axis relative to the clamp and such that the first clip is selectively removable from the clamp; and
 a second coupling system that rotatably and selectively couples a second clip to the clamp such that the second clip is rotatable about a second axis relative to the clamp and such that the second clip is selectively removable from the clamp.

11. The organization system of claim 10, wherein the first coupling system comprises a first coupler that is integrally coupled to the clamp and a second coupler that is integrally coupled to at least one of (i) the clip and (ii) an adapter bracket that is configured to couple to, and between, the clip and the clamp, wherein the first coupler is selected from one of (a) a first receiving hole and (b) a first protrusion that is sized and shaped to be rotatable received within the first receiving hole, and wherein the second coupler comprise the other of (a) the first receiving hole and (b) the first protrusion.

12. The organization system of claim 11, wherein the first coupling mechanism comprises a projection that is configured to be selectively engaged when the first protrusion is seated within the first receiving hole such that the projection selectively locks the first protrusion in the first receiving hole so as to rotatably and selectively couple the first clip to the clamp.

13. The organization system of claim 10, wherein the first coupling system comprises a ball and socket coupler.

14. An organization system configured to secure at least one of (i) a tube and (ii) a cord, the organization system comprising:
 a clamp having a first arm and a second arm, wherein a first end portion of the first arm is biased against a first end portion of the second arm such that the clamp is configured to selectively clamp onto a support structure when the support structure is disposed between the first end portion of the first arm and the first end portion of the second arm, wherein the clamp is configured to be selectively released responsive to manual squeezing of a second end portion of the first arm and a second end portion of the second arm;
 a first clip that is configured to selectively secure at least one of (i) the tube and (ii) the cord; and
 a first coupling system that comprises:
  a first receiving hole that is disposed at the first arm; and
  a first protrusion that is coupled to the first clip, wherein the first protrusion is sized and shaped to be rotatable received within the first receiving hole via a snap fit.

15. The organization system of claim 14, further comprising:
 a second coupling system that comprises:
  a second receiving hole that is disposed at the second arm; and
  a second protrusion that is coupled to a second clip, wherein the second protrusion is sized and shaped to be rotatable received within the second receiving hole.

16. The organization system of claim 14, wherein the first coupling system comprises a projection that is configured to selectively lock the first protrusion within the first receiving hole.

17. The organization system of claim 16, wherein the projection extends from a terminal end of the first protrusion such that when the first protrusion is seated within the first receiving hole, the projection is configured to catch an end of the first receiving hole to selectively lock the first protrusion within the first receiving hole.

18. The organization system of claim 15, further comprising:
 a third receiving hole that is disposed at the first arm; and
 a fourth receiving hole that is disposed at the second arm, wherein the third receiving hole and the fourth receiving hole are each configured to rotatably receive the first protrusion.

19. The organization system of claim 14, further comprising: first adapter bracket that comprises the first protrusion, wherein the first clip is rotatably coupled to the first adapter bracket.

20. The organization system of claim 19, wherein the first adapter bracket selectively and rotatably couples with a second adapter bracket that rotatably couples with a second clip.

* * * * *